(12) United States Patent
Burns et al.

(10) Patent No.: US 8,115,046 B2
(45) Date of Patent: Feb. 14, 2012

(54) MICRO ENCAPSULATION COMPOSITION FOR HYDROCARBONS AND DETOXIFICATION OF HIGHLY HAZARDOUS CHEMICALS AND SUBSTANCES

(75) Inventors: Lyle D. Burns, Bartlesville, OK (US); Geoffrey O. Mitchell, Norman, OK (US); Marcus S. Burns, Bartlesville, OK (US); Michael A. Burns, Bartlesville, OK (US)

(73) Assignee: RTA Systems, Inc., Norman, OK (US)

( * ) Notice: Subject to any disclaimer, the term of this patent is extended or adjusted under 35 U.S.C. 154(b) by 734 days.

(21) Appl. No.: 12/355,991

(22) Filed: Jan. 19, 2009

(65) Prior Publication Data
US 2009/0245939 A1    Oct. 1, 2009

Related U.S. Application Data

(60) Provisional application No. 61/022,153, filed on Jan. 18, 2008.

(51) Int. Cl.
*A62D 3/36* (2007.01)
(52) U.S. Cl. ........ 588/318; 588/313; 588/401; 588/901; 252/186.37

(58) Field of Classification Search .................. 588/318, 588/313, 401, 900, 901; 252/186.37
See application file for complete search history.

(56) References Cited

U.S. PATENT DOCUMENTS
2008/0200746 A1 * 8/2008 Bird et al. ..................... 588/318
* cited by examiner

*Primary Examiner* — Edward Johnson
(74) *Attorney, Agent, or Firm* — Fellers, Snider, Blankenship, Bailey & Tippens, P.A.

(57) ABSTRACT

A two-component, water based micro encapsulation composition and method for the cleanup of hydrocarbon spills or contaminates on various surfaces and media. The two-part formulation includes a first solution including water in a predetermined ratio of a water soluble alkaline silicate solution having at least one alkali metal and a predetermined ratio of at least one water soluble surfactant; and a second solution including water, a predetermined ratio of water soluble acid, a predetermined ratio of water dispersible polymer, a predetermined ratio of water soluble hydrotrope, and a predetermined ratio of at least one water soluble flocculating agent. A method of using the two-part formulation includes preparing the two-part formulation, allowing the first solution to contact the hydrocarbon or chemical contaminate; allowing the second solution to contact the first solution and contaminate to form a homogeneous mixture; and removing the homogeneous mixture.

20 Claims, No Drawings

MICRO ENCAPSULATION COMPOSITION FOR HYDROCARBONS AND DETOXIFICATION OF HIGHLY HAZARDOUS CHEMICALS AND SUBSTANCES

This application claims the benefit of U.S. Provisional Patent Application Ser. No. 61/022,153 filed on Jan. 18, 2008 and incorporates said provisional application by reference into this document as if fully set out at this point.

FIELD OF THE INVENTION

The present invention relates, generally, to a composition and method for remediation of hydrocarbon spills. More particularly, the present invention relates to a two-component water based micro encapsulation composition and method for the cleanup of hydrocarbon spills or contaminates on a number of different surfaces and media.

BACKGROUND OF THE INVENTION

Micro Encapsulation

There are many sites contaminated with hazardous organic substances. These contaminants permeate and adsorb onto soils, diffuse to interstitial saturated zones, dissolve into ground waters, and migrate to subsurface aquifers over time. Contaminants may strongly adsorb on soil structures and be only slightly water soluble, making removal difficult. Thus, the ease of contaminant transport within and removal from the soil by most commercially acceptable technologies is variable at any particular site. Likewise, contaminants may be resistant to normal subsurface chemical and biological degradation processes, thus limiting the selection of a treatment process.

Depending on the processes, soil, sludge or aggregate remediation technologies are often divided into three categories. One group uses chemical reduction, oxidation, thermal destruction or biochemical means to change the pollutants into non-hazardous products of different chemical composition. Examples are catalytic dehalogenation, Fenton oxidations, ozone, thermal treatments such as incineration and anaerobic/aerobic bioremediation either in situ or ex situ, bioventing, bioslurry, biofiltration and anaerobic dechlorination.

A second category consists of mass transfer technologies that use physical or chemical means to take the contaminants out of the soil followed by treatment or destruction in another process step. These are often called "Pump and Treat" technologies. Steam stripping, soil vapor extraction, soil washing, low or high-temperature thermal desorption and solvent extraction are examples of this second technology category. These technologies have many limitations. Most are not effective at treating all contaminants in the contaminant group. For example, halogenated compounds are less amenable to bioremediation than non-halogenated compounds. Likewise, with the popular Soil Vapor Extraction technology, the heavier, less volatile compounds are more difficult to remove from subsurface soil. Many innovative treatment technologies, far too numerous to discuss in detail, fall into these first two categories; however, none are a panacea.

The third category of remediation technologies is comprised of technologies that bind contaminants into a solid matrix. Any contaminants leached into the environment are reduced to levels below those regulated by governmental agencies. There are many innovations in the stabilization and solidification technologies that macro encapsulate contaminants or contaminated soil into a solid monolith after processing. Nine distinct innovative processes or groups of processes in this third category include: (1) bituminization, (2) emulsified asphalt, (3) modified sulfur cement, (4) polyethylene extrusion, (5) pozzolan/Portland cement, (6) radioactive waste solidification, (7) sludge stabilization, (8) soluble phosphates, and (9) vitrification/molten glass. The biggest problem with these technologies is that they are limited to primarily inorganic more so than organic contaminants. The technology of the present invention is similar to solidification and stabilization except it is based on micro encapsulation techniques and works very well with organic contaminants.

The prior art is abundant with references (U.S. Pat. No. 3,837,872, U.S. Pat. No. 4,518,508, U.S. Pat. No. 4,581,162, U.S. Pat. No. 4,600,514, U.S. Pat. No. 4,622,175, U.S. Pat. No. 4,909,849 among others) to methods of treating wastes with sodium silicate and a pozzolanic setting agent such as Portland cement, fly ash, kiln dust, lime, gypsum or calcium carbonate to react with each other in an immobilization/stabilization method forming a large chemically and mechanically stable macro encapsulated water insoluble solid. Some of the cement stabilization processes show good short-term results with metals, but very few show good long-term stability, especially with organics.

In other prior art, Heacock (U.S. Pat. No. 5,295,761) formulated sodium silicate with a glycol and sodium methyl silanolate. This compound referenced as sodium methyl silanolate, $CH_3Si(OH)_2O^-Na^+$, is better known as sodium methylsiliconate available from Dow Corning and in other technologies is used as a hydrophobing agent. Sodium methylsiliconate is commercially used with sodium silicate as a sealant for concrete. According to Heacock, as the soil is mechanically pulverized, air is continuously sparged into the soil as the formulation is applied. Heacock believes that the present formulation breaks down the chemical composition of the hydrocarbon contaminants in soil to inhibit the volatilization of any toxic components into the atmosphere. During the process, the pH of the soil is monitored and when it reaches a pH of 7, Heacock claims "hydrocarbon concentrations in the soil are effectively neutralized." Actually, the inventor of the present application believes air sparging must provide great assistance in delivering the volatile contaminants from the soil into the air to produce the results obtained in the single example provided, because to one skilled in the art, for this formulation to have any reactivity toward hydrocarbon decomposition is doubtful.

Other examples of dubious prior art are represented by Loomis (U.S. Pat. No. 5,478,389) and Spence (U.S. Pat. No. 6,436,884) whereby Spence actually questions the validity of Loomis's patent, but both have similar compositions of a sodium silicate, a surfactant and a polyol such as ethylene glycol. Loomis mixes an aqueous formulation of the art in a jar with the various contaminants such as an insecticide, aromatic hydrocarbons, and chlorinated hydrocarbons. As the jar sets for two to three weeks, a two phase system results with the organic contaminants partitioned into the solid silica precipitate formed in the bottom of the flask. The sample analyzed for contaminate was taken from the upper water layer and contrasted with the control. Spence takes the art one step further to claim extremely low levels of contaminant cleanup on surfaces contaminated with poly chlorinated biphenyl (PCB) compounds and dismisses the ability of Loomis's invention to do the same. Furthermore, Spence claims his invention destroys PCB compounds in an alkali metal catalyzed dechlorination reduction reaction in less than 12 hours.

Loomis's preferred formulation was reproduced in our laboratory only to find two-phase incompatibility with the T-Mulz surfactant. Shaking the sample produced a hazy solution. When 3 ml of the formulated sodium silicate was mixed with 3 ml of used motor oil, a low level emulsion formed. Three ml of an 8 percent by weight (using 75% phosphoric acid) phosphoric acid solution was added to the mixture to form a micro encapsulated oil. The resultant mass bled about 50 percent of the oil from the mass over a few days. The experiment was repeated using the acidic polymer formulation of the invention and a significant improvement was obtained forming a wet oily pasty solid, although the improvement is far inferior to the micro encapsulation samples obtained with the "dual use" silicate and polymer formulations of the invention.

In U.S. Pat. No. 5,076,938, Noonan et. al. proposed a two component method for encapsulating hydrocarbon systems with the combination of an emulsifier solution and a sodium silicate solution. The method comprises the addition of an acidic emulsifier solution to a hydrocarbon, then adding a sodium silicate solution to the emulsified hydrocarbon. The mixture changes to a thick agglomerated gel. According to the patent, the preferred emulsifier may consist of 30% concentrated phosphoric acid, 8% citric acid, 4% sodium chloride, 5% nonyl phenol ethoxylate, 6% sodium dodecyl benzene sulfonic acid, 4% linear alcohol ethoxylate, 3% phenyl glycol ether and 40% water. Sol gel systems formed by precipitation of sodium silicate in this manner have been known for years. They lack the cohesive ability to bind the contaminant into the sol gel through surfactants alone, compared to the inventive formulations. Both the emulsifier and the silica solution of Noonan's invention are considered corrosive by US Department of Transportation standards since the pH of the concentrates are less than 2 and greater than 12.5 respectively.

In 1997, the current inventor Burns (U.S. Pat. No. 5,678,238), showed it was possible to formulate a sodium silicate system with an emulsifying amount of selected surface active agents and utilize an acidic polyacrylate to micro encapsulate the contaminant into a non-leachable silicate mass. This prior art was suitable for use on hydrocarbon contaminants and selected chemicals for cleaning surfaces and bulk contamination from spills. The polymer agent aids in binding the hydrocarbon in the micro encapsulated mass to reduce hydrocarbon syneresis in the wet form.

The inventor's previous art (U.S. Pat. No. 5,678,238) taught improvements over Noonan, in that Noonan's prior art is incapable of cleaning surfaces as a single component micro encapsulation system because the silica does not have emulsifying capacity. Also, Noonan's acidic emulsifier lacks a suitable binding polymer in the acidic solution that is responsible for the improved micro encapsulation properties. U.S. Pat. No. 5,678,238 is superior to that of Heacock (U.S. Pat. No. 5,295,761) because Heacock does not incorporate surfactants in the silica system for desorbing the hydrocarbon contaminants from the soil. Moreover U.S. Pat. No. 5,295,761 relies on air injection to dry the silica in the soils whereby there is no control over air stripping of the volatile hydrocarbons that undoubtedly affects the results. Likewise, Loomis (U.S. Pat. No. 5,478,389) and Spence (U.S. Pat. No. 6,436,884) do not have two component systems to micro encapsulate bulk components and a single component system will not work for bulk contamination. Neither Loomis nor Spence have the ability for rapid spill clean up being a single component system.

The current invention shows unexpected improvements over all of the prior art in its capacity to micro encapsulate hydrocarbons and chemicals down to low ppm levels of leachability at half the concentration of the inventor's previous prior art and it can optionally be formulated for "dual-use" with a third component for detoxification of highly hazardous substances prior and during the micro encapsulation process.

CB Agent Detoxification

Terrorist threats involving weapons of mass destruction such as CB Agents have a worldwide presence. The use and the threat of CB Agent use is of paramount concern to the United States national defense as well as state and local law enforcement. A CB Agent attack can be localized or dispersed to affect a large population.

Certain chemical warfare agents share chemical and physical characteristics that present an opportunity for countermeasure development. The CW G-Agents are examples of phosphorus containing compounds. Mustard is a sulfur containing CW H-Agent. VX is an example of the group known as CW V-Agents with chemistry similar to that of insecticide families. In each of these cases, after these compounds have undergone certain types of chemical reactivity, they loose much of their toxicity and are rendered harmless. However, because of the extreme level of toxicity for these compounds, they require complete reaction in a very short time period.

Presently, the most common CB Agent decontamination procedures at forward operating locations involve spraying a liquid solution or foam on the exterior surface of the military asset. The military's current decontaminating solutions (Decontaminating Solution 2 (DS2), and super tropical bleach) are corrosive and (in the case of DS2) contain aggressive organic solvents. While several alternative products are available that have reduced toxicity with lower risk of damage to materials, these products take significantly longer than current decontaminating solutions to destroy CB Agents.

Other methods (Tadros U.S. Pat. No. 6,566,574) have recently been developed for CW Agent decontamination or detoxification. For example EasyDecon™ or MFD (also known as DF200) is a decontaminating foam formulation developed by Sandia National Laboratories and now available from EnviroFoam Technologies, Inc. or MODEC Inc. While the product has been demonstrated to be effective against a range of CB agents, it requires a residence time of 15 minutes to one hour to destroy CB agents. For some agents, this is substantially longer than the residence time required by the military's current decontaminating solution (DS2) and the present inventive application. The formulation also leaves a liquid residue from the surfactants and alcohols. Furthermore, an effectiveness discrepancy has been reported by the EPA in the anthrax simulant test results for decontaminating six logs of *Bacillus subtillis* spores on a hard nonporous surface at one hour contact time as reported under EPA Contract No. 68-C-02-067 "Compilation of Available Data on Building Decontamination Alternatives" EOA/600/R-05/036, March 2005.

QAC Decontaminant Solution, developed by the Navy Surface Warfare Center (NSWC) developed a decontaminating solution based on quaternary ammonium compounds and a solid form of hydrogen peroxide. From the prior art (Cronce U.S. Pat. No. 5,760,089 and U.S. Pat. No. 5,859,064), the best detoxification data is presented for the following Agents: VX: (37% in 30 sec. and 95% in 60 min.), Mustard: (20% in 30 min. and 66% in 60 min.) and GD: (99% in 30 sec. and 99+% in 60 min.). These results are inferior to those obtained with the present application. Furthermore, the preferred composition contains 20% of the benzyltrialkyl ammonium chloride salts and 30% of isobutanolamine as a corrosion inhibitor-solvent. These materials would remain as a waste residue that could be construed as hazardous whereas any components of the inventive formulations would be micro encapsulated.

The M100 Sorbent Decontamination System is another form of decontamination development by the US Army. This system could also be used on sensitive equipment. It consists of fabric mitts containing absorbent particles that capture chemical agents. These suffer from the following disadvantages 1) They are not effective against biological agents. 2) They are impractical for use on large surfaces of materials, parts or components. 3) They require personnel to come in close contact with the agents. This increases their risk of exposure if their protective gear is damaged or defective. 4) Agents can slowly desorb from the material over time. Thus, the contaminated sorbents must be handled as hazardous materials and properly treated to eliminate the hazard.

The L-Gel foam products, developed by Lawrence Livermore combine a commercially available oxidizer (Oxone) with a colloidal amorphous silica gelling agent (Cab-O-Sil EH-5 fumed silica) to create a thixotropic gel that will adhere to walls and ceilings, and other materials like a paint. The mixture is spray applied and once dry, it can be vacuumed up. Decontamination with L-Gel takes about 30 minutes after application which is still to slow to be effective. It eventually dries out in about six hours and can be removed by vacuuming.

CSI-1, available from Chemical Solutions International, is a product designated specifically to reduce the viability of anthrax. Testing of CSI-1 with 10,000,000 spores indicates a reduction of viable spores to <500 after 30 minutes. After 2 hours, the result was a complete loss of spore viability. According to the MSDS, it contains a ethylene glycol butyl ether, aryl alkyl ammonium chloride, and glutaraledehye. It must be applied to the surface in sufficient quantities that it will stay wet for 2 hours, then wipe clean with wet paper towels until clean. The current invention can take the viable anthrax simulant spores to a complete loss of spore viability in less than two minutes.

Other technologies include the use of chlorine dioxide, TechXtract (Environmental Extraction Technologies, Inc.), CASCAD (Canadian Aqueous System for Chemical—Biological Agent Decontamination), paraformaldehyde, and methyl bromide. Although each of these technologies each have their own merits, none are a panacea.

SUMMARY OF THE INVENTION

The present invention relates to a two-component water based micro encapsulation composition and method for the cleanup of routine hydrocarbon spills or contaminates on a number of different surfaces and media. Moreover, the present invention relates to an improved micro encapsulation composition with ability to be promptly modified when the need arises for the "dual-use" purpose of rapidly detoxifying highly hazardous materials into significantly less hazardous by-products and then micro encapsulating the less hazardous by-products from the detoxification. Such detoxification component may be in the form of a reactive entity such as an oxidation agent added to one of the two micro encapsulation formulations just prior to detoxification. After a time, then the other micro encapsulation formulation is added to the by-product mixture containing the first micro encapsulation formulation containing any residual detoxifying component for the purposes of completing the micro encapsulation. Such highly hazardous materials include Toxic Industrial Chemicals (TICs), Toxic Materials (TMs) as well as Chemical Biological Agents (CB Agents).

More particularly, the invention relates to two liquid chemical formulations that can be used together to convert liquid organic wastes into solid materials and significantly reduce the aqueous leachability of hydrocarbon and chemical spills on surfaces for removal or to remediate contaminated media. The addition of a third reactive component to either the first or the second formulation can produce a modified formulation capable of rapidly oxidizing highly hazardous materials to substances of much lower toxicity. Within a few minutes, the second formulation may be added for the purpose of micro encapsulating the less hazardous by-products in a non-leachable solid form. Even more particularly, the inventive micro encapsulated solid may initially still contain very low ppm-ppb levels of unoxidized TICs, TMs or CB Agents along with the by-products, but because they are micro encapsulated, the toxicity is further mitigated by reduced availability or vapor suppression of the TICs, TMs or CB Agents in the microcapsules. The second micro encapsulation component also brings the pH of the mixture to neutral, thus hastening the decomposition of any residual oxidizing component to non hazardous materials. TICs and CB Agents are self-explanatory in meaning, but TMs may include for example biological substances such as blood borne pathogens, certain infectious medical wastes or nano size inorganic wastes materials such as asbestos that may be encapsulated. In one aspect, this invention is directed to demonstrate that the preferred embodiments of the invention involve liquid chemical formulations that may be applied by spraying or misting the contaminated surface or media and immediately form a solid micro encapsulate or detoxify the highly hazardous substance with subsequent micro encapsulation into a solid medium.

The present invention disclosed and claimed herein, in one aspect thereof, comprises a water based two-component micro encapsulation system with the ability to micro encapsulate hydrocarbons and chemicals into a solid non-leachable form. The first formulation of the two-component system is an aqueous, alkaline formulation with predetermined ratios of an alkaline water soluble silicate solution having at least one alkali metal and a predetermined ratio of water soluble surface active agents for detergency, penetration and contaminant emulsification. Depending on the choice of the formulation components, a hydrotrope surfactant is sometimes necessary for maintaining the stability of the solution.

The second formulation of the two-component micro encapsulation system is an aqueous acidic polymer formulation with a predetermined ratio of an acid, an improved polymer flocculent-inorganic coagulant mixture for binding the dispersed active agent in a silicate core matrix, a quaternary surfactant, and a hydrotrope for maintaining the stability of the micro encapsulate.

For micro encapsulation of hydrocarbons and chemicals, the first alkaline formulation is applied to the contaminant followed by application of the second acidic polymer formulation. The pH of the resultant solid micro encapsulated material with a water-wet surface is neutral. The surface of the micro encapsulate contains only extremely low levels, if any, of the hydrocarbon or chemical contaminant. As the water evaporates the solid becomes a dry powder with the appearance of talc and often, the color of the contaminant.

The present invention disclosed and claimed herein, in another aspect thereof as a "dual use" detoxifying and micro encapsulation system, may contain an optional third detoxifying agent incorporated into the first alkaline formulation (if the detoxification agent is alkaline compatible) and added to the highly toxic contaminant for the purposes of first, rapidly detoxifying highly hazardous contaminant. After a predetermined detoxification time (usually a few minutes), then the second aqueous acidic polymer formulation is added to the mixture of the first alkaline formulation containing the detoxifying agent for the purposes of completing the micro encapsulation process to form a non-leachable solid. The modes of detoxification include, but are not to be limited to, alkaline nucleophilic hydrolysis, alkaline oxidation and acidic oxidation.

The present invention disclosed and claimed herein, in yet another aspect thereof as a "dual use" detoxifying and micro encapsulation system, may contain an optional third detoxifying agent incorporated into the first acidic polymer formulation (if the detoxification agent is acid compatible) and added to the highly toxic contaminant for the purposes of first, rapidly detoxifying highly hazardous contaminant. After a predetermined detoxification time (usually a few minutes), then the second aqueous alkaline formulation is added to the mixture of the first acidic polymer formulation containing the detoxifying agent for the purposes of completing the micro encapsulation process to form a non-leachable solid. The two-component micro encapsulation system has unique distinguishing characteristics that make it versatile for many different applications.

The present invention disclosed and claimed herein, in another aspect thereof as a "dual use" detoxifying and micro encapsulation system, provides a benefit of binding any very low level residual highly hazardous contaminant on a molecular level in the micro encapsulate further reducing the level of toxicity in the environment. Furthermore, the significantly less hazardous by-products of reaction with the detoxifying agent and the highly hazardous contaminant are likewise bound on a molecular level in the micro encapsulate allowing for a solid form of waste that may be collected for further treatment or disposal leaving no liquid by-products and no lasting environmental impact The present invention disclosed and claimed herein, in another aspect thereof as a "dual use" detoxifying and micro encapsulation system, provides a further benefit of neutralizing any residual detoxifying agent into a non-hazardous entity. Furthermore, of greatest benefit is that detoxification in the "dual use" system is very rapid on the order of a few minutes which is of utmost importance with the highly hazardous tendency of CB Agents.

DETAILED DESCRIPTION OF THE PREFERRED EMBODIMENT

Biological Warfare Agents

Toxicants are defined as any chemical or biological compound or agent that can cause death or permanent harm to humans or animals. Neutralization is defined as the mitigation, detoxification, denaturation or destruction of toxicants to the extent that the toxicants no longer cause acute adverse effects to humans, animals or other life forms. There are hundreds of Biological Warfare Agents (BW Agents) available for use by terrorists. They are grouped into the categories of spore forming bacterium (anthrax), vegetative bacterium (plague, cholera), virus (smallpox, yellow fever) and bacterial toxins (botulism, ricin). Spores are the most difficult microorganisms to kill. An example of a spore agent is *Bacillus anthracis* or anthrax. Spores are tough and environmentally durable, so they are prime agents of interest as offensive weapons. *Bacillus subtilis* var. *niger* (formerly *Bacillus globigii*) is a common non-pathogenic soil bacterium. *B. globigii* is no longer a recognized name, and at least some of these now are called *B. subtilis* (but not *B. subtilis* var. *niger*). *B. subtilis* var. *niger* is no longer a recognized name, and at least some of these isolates are now called *Bacillus atrophaeus*.

*B. anthracis*, which exists world-wide in nature (often in the soil), is a spore-forming organism, the spore being a hardy form that easily lends itself to use as a warfare agent. The *B. anthracis* coat is of particular interest because the spore is the infective particle for anthrax bacterial disease. Like a golf ball, anthrax spores are made of many layers of material, which protect DNA in the core. (Journal of Bacteriology, Vol. 186, pp. 164-178, January 2004)

The spores causing anthrax are 1 to 1.5 micrometers in size, rod-shaped, odorless, and tasteless. Inhaling between 8000 and 50,000 spores (a lethal amount, easily inhaled in one breath) can cause the disease's onset. Fifty thousand spores in a glass dish are invisible to the naked eye. To help comprehend how small the spores are, one common housefly can carry about 7.35 billion spores attached to its external body hairs. Consequently, if 50,000 spores constitute a theoretically lethal dose, a housefly could carry a lethal dose for over 100,000 individuals.

Vegetative cells are more common as agents, but they are less resilient in the environment making them more difficult to use in an offensive capacity. Examples are plague or cholera and the simulant for vegetative cells is *Erwinia herbicoli*. Viruses require a host to replicate, and are a rising threat because many are very survivable in the environment. Examples of a virus are smallpox or yellow fever and because specific simulants do not exist for these viruses, a bio phage such as Bacteriophage MS2 is typically used for testing. The fourth class of biological agents are toxins. Although less toxic than most organisms, the toxins are more easily produced in many cases and are very survivable. The most prominent toxins are botulism and ricin. A simulant for biological toxins is ovalbumin. These simulant organisms are not typically classified as human pathogens and are selected based on their documented lack of toxicity to healthy humans.

The mechanism for the destruction of BW agents may not be as well understood as that for Chemical Warfare Agents (CW Agents). In the case of vegetative bacterial cells and viruses, the kill mechanism is most likely due to the oxidizing effect of oxidizers such as hydrogen peroxide. However, hydrogen peroxide concentrations from 10-20% are required for denaturation of anthrax spores, which are the more resistant BW Agents. The spore DNA must be exposed to the oxidizer to detoxify the spore agent. The spore coat protects the DNA and must be breached to effectively kill the spore agent. A possible mechanism confirmed by Tadros U.S. Pat. No. 6,566,574 for spore kill is that cationic surfactants can soften and disrupt the spore coat resulting in breeches through which hydrogen peroxide can enter and attack the spore DNA.

BW Agents—Anthrax Simulant Detoxification with U.S. Pat. No. 5,678,238

The commercial alkaline TERRACAP™ 3000 additive and acidic TERRACAP™ 4000 additive are the commercial products of the U.S. Pat. No. 5,678,238 invention available from RTA Systems, Inc., Oklahoma City, Okla. A preliminary test was conducted by a government official with the original products from this art to determine if the existing TERRACAP formulations could micro encapsulate a anthrax simulant, *Bacillus globigii* (*Bacillis subtilis* var. *niger* ATCC 9372). The result was reported that the micro encapsulation agents had a 75% efficacy rate at denaturing or micro encapsulation of the anthrax simulant. Whether the efficacy reduction was due to the micro encapsulation process or actually denaturing of the simulant or a combination of both was not reported. Although the original stand-alone result is far from having utility, the result was encouraging and allowed the applicant to receive Air Force SBIR and later OCAST funding for this work.

The research effort was aimed at substantial improvements and modifications to the existing art to create utility as a "dual-use" system that can provide improved micro encapsulation of mundane hydrocarbons used in transportation and certain characteristic hazardous wastes that contaminate surfaces and media. The "dual-use" concept is invoked when hazardous or highly hazardous chemicals or substances are encountered whereby the modified system with a detoxification agent incorporated can detoxify the hazardous or highly hazardous chemicals or substances just prior to or during the micro encapsulation process. The novel concept of a "dual-use" system and providing utility from additional protection by detoxification of the hazardous or highly hazardous chemicals or substances with subsequent micro encapsulation provides an extra level of protection to life and the environment.

The initial modification to the TERRACAP 3000 utilized an alkaline stable quaternary ammonium compound, cetylpyridinium chloride (CPC) and the activator tetrasodium ethylenediaminetetraacetate, the combination which is known to have sporicidal activity through out a pH range. Efforts were not made to optimize the concentration of the sporicidal agent except that the 1 to 1 ratio of Quat to activator (0.5 weight percent each) provided by the manufacturer was followed. CPC is available as Sumquat 6060/CPC from Zeeland Chemical Inc., (Zeeland Mich.). In these preliminary tests, the best spore kill levels were 94.6% in two minutes and with no change (95.1%) at 60 minutes, an improvement over the original TERRACAP 3000 and TERRACAP 4000 micro encapsulation, but still not of a level to justify utility. Further efforts discussed below in this application will demonstrate substantial success with BW Agents using the inventive compositions.

The mechanisms for the destruction of BW Agents are not as well understood as that of CW Agents. In the case of vegetative bacterial cells and viruses, the kill mechanism is most likely due to the oxidizing effect of oxidizers such as hydrogen peroxide. However, hydrogen peroxide concentrations from 10-20% are required for spore kill of Anthrax spores. The spore DNA must be exposed to the oxidizer to detoxify the spore agent. The spore coat protects the DNA and must be breached to effectively kill the spore agent. A possible mechanism confirmed in for spore kill is that cationic surfactants can soften and disrupt the spore coat resulting in breeches through which hydrogen peroxide can enter and attack the spore DNA. (As taught in U.S. Pat. No. 6,566,574 incorporated herein by reference.)

Chemical Warfare Agents

Many of the known CW Agents that are likely to pose a threat from terrorists are nerve agents and mustard. The nerve agents share chemical similarity since they are phosphorus-containing compounds that can be altered when subjected to nucleophilic attack or oxidation processes. These CW Agents include sarin (O-isopropyl methylphosphonofluoridate), soman (O-pinacolyl methylphosphonofiluoridate), GF or sometimes call cyclohexyl sarin (O-cyclohexyl methylphosphonofluoridate), tabun (O-ethyl N,N-dimethyl phosphoramidocyanidate) and VX (O-ethyl S-2-diisopropylaminoethyl methyl phosphonothiolate). The chemical structures depicting the similarity of these agents are shown in FIG. 1. If the phosphorous-containing compound is chemically altered by nucleophilic hydrolysis or oxidation, it is detoxified and thereby neutralized as a CW Agent. These CW Agents are only sparingly soluble in water.

FIG. 1. Chemical Structures of CW Agents $$C_3H_7-O-\underset{CH_3}{\overset{\overset{O}{\|}}{P}}-F \qquad C_5H_{11}-O-\underset{CH_3}{\overset{\overset{O}{\|}}{P}}-F$$

Sarin (GB)        Soman (GD)

$$cy\text{-}C_6H_{11}-O-\underset{CH_3}{\overset{\overset{O}{\|}}{P}}-F \qquad C_2H_5-O-\underset{N(CH_3)_2}{\overset{\overset{O}{\|}}{P}}-CN$$

GF        Tabun (GA)

$$C_2H_5-O-\underset{CH_3}{\overset{\overset{O}{\|}}{P}}-S-C_2H_4-N(C_3H_7)_2$$

VX $$Cl-C_2H_4-S-C_2H_4-Cl$$

Mustard (HD)

Another common CW Agent is mustard (bis-(2-chloroethyl)sulfide) shown in FIG. 1. Although mustard is chemically quite distinct from the other CW Agents mentioned above, in that it does not share the phosphorus-containing group, it does exhibit chlorine atoms bound to carbon atoms at both ends of the molecule. These carbon-to-chlorine bonds are also subject to hydrolysis and the central sulfur can be oxidized to sulfoxide or sulfone, thereby rendering the molecule ineffective as a CW Agent. Like the nerve agents, mustard is only sparingly soluble in water.

Several simulants are well accepted by the US Government for use in CW Agent testing. These simulants have chemical structures and physical properties similar to those of the live agents, but they have significantly reduced toxicity. The following chemical simulants were used by the applicants:

G-Agent Simulant:
Diphenyl chlorophosphate (DPCP) $(C_6H_5O)_2P(O)Cl$
Or Dimethyl methylphosphonate (DMMP) $CH_3P(O)(OCH_3)_2$
H-Agent Simulant (Mustard):
2-Chloroethyl phenyl sulfide (CEPS)$C_6H_5SCH_2CH_2Cl$
VX-Agent Simulant
95% Malathion CW Agents—Simulant Detoxification with the Prior Art U.S. Pat. No. 5,678,238

Micro encapsulation of the selected simulants was conducted with the commercially available TERRACAP 3000 and 4000 additives (products of U.S. Pat. No. 5,678,238) in a batch mode to detect simulant detoxification by alkaline hydrolysis. In an open beaker, the G-Agent simulant, DPCP, rapidly reacted with the commercial TERRACAP 3000 prior to addition of the TERRACAP 4000 additive to microencapsulate the contaminate by-products. The extent of reaction was greater than 99.995% (limit of detection 50 ppm by gc-ms) effective within the 5 minutes prior to the quenching by extraction with the aggressive solvent blend of 50/50 methylene chloride/acetone according to the procedure found below. The extremely effective denaturing of the DPCP is due to the alkaline OH⁻ groups in the silica formulation hydrolyzing the P—Cl bond.

The Mustard simulant, CEPS, did not appreciably react under the conditions described above with the commercial micro encapsulation agents TERRACAP 3000 and TERRACAP 4000. The peaks for CEPS were so large that an accurate measurement was not possible. The levels of reaction with CEPS was probably less than 50%. The VX simulant, Malathion, was not tested because alkaline hydrolysis is known not to be the preferred method of detoxification. Although the micro encapsulation technology of the prior art was successful for DPCP, it does not have universal applicability across the spectrum of CB Agents.

Modification of the commercial TERRACAP formulations (U.S. Pat. No. 5,678,238) to those of the invention provided substantial improvements in detoxification effectiveness on the mustard and VX simulants as well as further improvement on the G-Agent simulant and substantial improvement in denaturation of the Anthrax simulant.

Development of the Dual-Use, Two-Component Micro Encapsulation System.

From the initial effort at BW Agent micro encapsulation, the results for 5-minute detoxification of the anthrax simulant and/or its micro encapsulation were high (96%), but due to the extremely high toxicity level of the anthrax spore, this result is promising at best and warrants substantial improvement. Likewise on the CW Agent side, the result for G-Agents (DPCP) were impressive 99.995% in 5-minutes, but DPCP or G-Agents are easy to hydrolyze. The existing technology was not impressive for Mustard or VX. Thus, there was a need for substantial improvement.

Distinguishing Characteristics

There are several novel and unexpected distinguishing characteristics to the improved micro encapsulation system of the inventive application that allows for optimization as described below:

1. A two-component system based on an aqueous alkaline silicate formulation and a slightly acidic aqueous polymer formulation that interacts to micro encapsulate a substrate on a molecular level to form a stable, solid, impermeable silica-polymer matrix that has 100% more capacity than the micro encapsulations system of U.S. Pat. No. 5,678,238.
2. The micro encapsulated matrix is capable of withstanding the leachable effects of water, stable to aqueous acid or base, and it will pass the EPA TCLP (method 1311) extraction and subsequent analysis for environmental waste considerations as well as the EPA 1320 Multiple Extraction Test for long term stability.
3. Contaminant substrates may be selected from hydrocarbons, organic chemicals, organometallic chemicals, oxidized metallic ions, radioactive metal ions, or biological agents that are miscible or emulsifiable in the system.
4. The micro encapsulation system mitigates the characteristic properties of wastes such as flammability, toxicity, corrosivity, or reactivity.
5. The alkaline silicate formulation may contain surfactants, emulsifiers, wetting and stabilizing agents, etc. to immobilize the chemical or biological agent.
6. The slightly acidic polymer formulation may contain surfactants, emulsifiers, wetting, stabilizing agents, flocculants, and coagulating agents etc. to immobilize the chemical or biological substrate.
7. Either the silicate formulation or the polymer formulation may additionally contain oxidizing or reducing agents, hydrolyzing agents, or other nucleophiles, etc. that react to mitigate the toxicity of CB Agents, TICs or TMs in the silica-polymer micro encapsulated matrix.
8. The system is adaptable. If a component from item 5, 6 or 7 above is not shelf stable in the silicate formulation, it may be stable and formulated in the polymer formulation. Either the alkaline silicate formulation or the acidic polymer formulation may be applied first or both applied almost simultaneously for micro encapsulation. The flocculation-coagulation interaction is immediate or it can be retarded if necessary.
9. The water-based solutions may be spray applied and the micro encapsulated material of neutral pH may be removed from the object by dispersing with a water pressure spray, brushing, wiping, or vacuuming when wet or dry.

It can be seen from the distinguishing characteristics, there is great diversity in the improved micro encapsulation process. However, there was a great challenge incorporated in the improvements as well that was not obvious to one skilled in the art. First, it was desirable to improve the efficiency of the system which would logically enhance the cost effectiveness for routine clean up of hydrocarbon transportation fluids and yet retain the Distinguishing Characteristics 2, 3 and 4. The most obvious tactic to improve micro encapsulation efficiency was to increase the sodium silicate concentration. This was difficult beyond a certain level, because of the existing competition by other components for the water in this highly electrolytic system. For example, concentrated alkaline sodium silicate formulations are of very high electrolytic strength and are highly hydrophilic. Introduction of competing hydrophilic substances such as in Characteristic 5 to obtain a composition with micro encapsulation utility as well as shelf stability with out the deleterious problems associated with long-term shelf stability such as splitting into two phases or silicate precipitation was very difficult.

Furthermore, the same challenge existed with Characteristic 6, because it is also a very electrolytic acidic substance and difficult to formulate for shelf stability. Second, inserting the agents of Distinguishing Characteristic 7 becomes a huge challenge because the solution equilibrium becomes favorable for system reactions with the component resulting in immediate or delayed precipitation of the silicate or the polymer formulation. By design, after the micro encapsulation reaction has occurred, the detoxification agent is neutralized as well to environmentally acceptable non-hazardous substances. Distinguishing Characteristic 8 provides a certain degree of freedom to formulate the certain components or the reactive detoxifying agent in either the alkaline silica or the acidic polymer formulation although there are still limitations.

Although there are unique Distinguishing Characteristics in a micro encapsulation system of this invention, the novel utility of this complex "dual-use" system is unexpected and to a large extent definitely not obvious to one skilled in the art because of all the potential incompatibilities of the individual components. The compositions of the invention have shelf stability, are capable of micro encapsulating up to 100% more contaminant than the formulations of U.S. Pat. No. 5,678, 238, and have the "dual-use" versatility capability of micro encapsulation of hydrocarbons and chemicals or detoxifying certain CW Agent simulants to less than 10 ppm and anthrax simulant to greater than log 7 efficacy, both in less than five minutes. In addition any by-products of detoxification and residual CW Agent simulants are micro encapsulated and removed from the environment, a characteristic that no other detoxification process can claim. The micro encapsulation of the invention restricts contaminant migration because of the extremely high surface area inside the porosity where the contaminant is entrapped in the amorphous silica. Amorphous silica is safe and known to be more stable than crystalline silica, which is a potential carcinogen.

For the first responder, it is critical to decontaminate facilities or equipment to an acceptable level in a matter of minutes in order to locate and treat casualties. In the restoration scenario, time is of less importance, but collateral damage, public perception, and re-certification (i.e. complete decontamination) is of greater consequence. A common formulation effective against all CB Agents must be suitable for use on a wide variety materials and surfaces. Additionally, the neutralization formulation must be able to be rapidly deployed in large quantities by first responders to effectively neutralize CB toxants while remaining relatively harmless to both people and property. The formulation of the present invention accomplishes these goals for civilian and military applications because it has dual-use capability. The benefits of the invention follow since it is:

1. Nominally, a two-component composition used for routine micro encapsulation of hydrocarbon fuels and oils,
2. Rapidly modified to a three-component micro encapsulation composition that can provide rapid detoxification of highly hazardous substances such as CB Agents and TICs,
3. Adaptable to solid support, bulk, aerosol and vapor phase CB Agent contamination,
4. Amenable to minimal health and collateral damage,
5. A minimal logistics support requirement technology,
6. Capable of producing no liquid by-products and no lasting environmental impact
7. Relatively inexpensive.

Components of the Inventive Formulations

Sodium silicate is a complicated system of various molecular weight silica polymers in an alkaline solution. Aside from requiring a certain minimum amount of buffered alkalinity, sodium silicate has no definite chemical combining numbers. When sodium silicate is acidified to a pH of less than about 10, the sodium silicate is converted partially to silicic acid. Silicic acid exists at these alkaline pH's as it is such a weak acid. Instead of precipitating and making silica, $SiO_2$, the silicic acid remains hydrated and forms a three-dimensional network in trapping the solvent water. This network is a gel since both phases are continuous.

Silicates which can be used for the compositions and processes of the present disclosure are the water soluble silicates which form silicate polymer chains or gel upon acidification. The preferred silicates are those of the alkali metals, especially sodium or potassium and combinations thereof. These silicates are commercially available as dry powders or concentrated aqueous solutions having in the range of from about 38 to 55 parts solids per hundred parts of solution and a pH in the range of from 10.5 to 13. Preferably, the water-soluble silicates, that are employed in the present disclosure have a molar ratio of silicon dioxide to alkali metal oxide in the range of from about 0.5:1 to about 3.5:1 and the alkali metal is sodium, potassium, and mixtures thereof. Most preferably, the ratio should be from about 3:1 to about 3.5:1. The concentration of sodium silicate solution in the micro encapsulation solution can vary over a wide range from 10 percent to 95% and preferably between 20 to 60 percent.

Anionic surfactants are surface-active compounds consisting of a hydrophobic alkyl chain and a hydrophilic group. Anionic surfactants are negatively charged in aqueous solutions due to the presence of a sulfate, sulfonate, carboxylate or phosphate group. They are water soluble and ionize to produce a negative charge in aqueous solution. Anionics are generally credited with excellent detergent cleaning properties. Common anionic surfactant groups are the acids, or sodium, potassium or ammonium salts of alkyl carboxylates (soaps), alkyl ether carboxylates, alkyl benzene sulphonates, alkyl ether phosphates, alkyl ether sulphates, alkyl naphthalene sulphonates, alkyl phosphates, alkyl phenol ether phosphates, alkyl phenol ether sulphates, alpha olefin sulphonates, aromatic hydrocarbon sulphonates, condensed naphthalene sulphonates, di-alkyl sulphosuccinates, fatty alcohol sulphates, mono-alkyl sulphosuccinates, alkyl sulphosuccinamates, and naphthalene sulphonates among others.

Representative examples of selected anionic surfactants useful in the inventive sodium silicate formulation might be sodium dodecylbenzenesulfonate, triethanolamine dodecylbenzene sulfonate, isopropylamine dodecylbenzene sulfonate, sodium capryl sulfonate, sodium $C_{14-16}$ alpha olefin sulfonate, ammonium lauryl sulfate, ammonium lauryl ether sulfate (EO=3), sodium 2-ethylhexyl sulfate, and alkylpolyether sulfonates (R=8-15, EO=3-15). These anionic surfactants may be incorporated in the sodium silicate formulations of the invention at concentrations ranging from 0.01 to 15 weight percent. More preferably, anionic surfactants may be incorporated in the sodium silicate formulations of the invention at concentrations ranging from 0.1 to 6 weight percent.

Nonionic surfactants are surface-active compounds with hydrophobic and hydrophilic groups. Nonionic surfactants do not ionize in solution because they have no electrical charge. They are mixtures of homologous structures composed of alkyl chains that differ in the number of carbons and with hydrophilic groups that differ in the number of ethylene oxide (ethoxylate, EO) propylene oxide (propoxylate, PO) and butylene oxide (butoxylate, BO) units. The most common are alcohol ethoxylates prepared by attaching ethylene oxide molecules to a water-insoluble molecule. Depending on the number of ethylene oxides and the number of carbon atoms, the nonionics can be classified as a wetting agent, a detergent, or an emulsifier. Common nonionic surfactant groups are the alkyl polysaccharides, alkyl amine oxides, alkyl glycosides, alkanolamides, fatty acid glucose amides, block copolymers, and ethoxylates of castor oil, alkyl alcohols, alkylphenols, ether amines, alkanolamides, ethylene glycol esters, alkyl amines, random copolymers, sorbitan esters, alkylcarboxylic acids, and alkyl amines.

Nonionic surfactants are often difficult to formulate in the highly electrolytic sodium silicate solutions of the invention. They often result in unstable two-phase systems such as the preferred composition of U.S. Pat. No. 6,436,884 which are not very useful. Nonionic surfactants normally require a substantial amount of a hydrotrope surfactant in sodium silicate solutions to provide solvative assistance. Likewise, the T-MULZ surfactant, an anionic blend from Harcross, used in the representative composition of U.S. Pat. No. 5,478,389 is not compatible resulting in a two-phase system. Phosphate esters are often difficult to solubilize in highly electrolytic sodium silicate solutions without a hydrotrope.

Representative examples of selected nonionic surfactants useful in the inventive sodium silicate formulation might be ethoxylated derivatives of nonylphenols (EO=7-11), alkyl alcohols (R=$C_9$-$C_{11}$, EO=8), cocamide (EO=6), coconut diethanolamide, alkylpolyglucoside, bis-(2-hydroxyethyl) isodecylcyclohexylpropylamine, stearyl ether (EO=23), isodecyloxypropylamine (EO=5), N,N-dimethyl-N-octylamine N-Oxide, and bis-(2-hydroxyethyl)($C_{12-15}$)alkyloxypropyl amine oxide. These nonionic surfactants may be incorporated in the sodium silicate formulations of the invention at concentrations ranging from 0.01 to 10 weight percent. More preferably, anionic surfactants may be incorporated in the sodium silicate formulations of the invention at concentrations ranging from 0.1 to 6 weight percent.

Amphoteric surfactants are surface-active compounds with both acidic and alkaline properties. Amphoteric surfactants include two main groups, i.e. betaines and real amphoteric surfactants based on fatty alkyl imidazolines structures during the synthesis of some of these surfactants. The key functional groups in the chemical structures of amphoteric surfactants are the semi quaternized nitrogen and the carboxylic group as shown below.

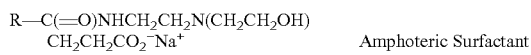
Amphoteric Surfactant

Betaines are characterized by a fully quaternized nitrogen atom and do not exhibit anionic properties in alkaline solutions, which means that betaines are present only as 'zwitterions' as shown below:

Betaine Surfactant

Imidazolines contain the real amphoteric surfactants that form cations in acidic solutions, anions in alkaline solutions, and 'zwitterions' in mid-pH range solutions. The mid-pH range (isoelectric range) in which the surfactant has a neutral charge is compound specific and depends on the alkalinity of the nitrogen atom and the acidity of the carboxylic group. Amphoteric surfactants are used in personal care products (e.g. hair shampoos and conditioners, liquid soaps, and cleansing lotions) and in all-purpose and industrial cleaning agents. Besides acting as mild surfactant, the amphoteric surfactant may improve the mildness of especially anionic surfactants. Common amphoteric surfactant groups are the alkyl amphoacetates and proprionates, alkyl Ampho(di)acetates, and diprionates, alkyl amphohydroxyalkyl sulfonates, alkylamido betaines, alkyl betaines, alkyl hydroxysultaines, iminodipropionates, and alkylimidazolines precursors to the amphoacetates and proprionates.

Representative examples of selected amphoteric surfactants useful in the inventive sodium silicate formulations might be disodium cocoamphopropionate, $C_{5-9}$ alkylamphoproprionate, sodium cocoamphopropionate, octyliminodipropionic acid, sodium beta-alanine N-(2-carboxyethyl)-N-[3-(decyloxypropyl)], alkyl imidazoline propionate ester, sodium lauriminodipropionate, disodium cocoamphodiacetate, sodium cocoamphoacetate and sodium caprylamphopropionate. These amphoteric surfactants may be incorporated in the sodium silicate formulations of the invention at concentrations ranging from 0.01 to 15 weight percent. More preferably, anionic surfactants may be incorporated in the sodium silicate formulations of the invention at concentrations ranging from 0.1 to 6 weight percent.

Hydrotropes are used as coupling agents to solubilize the water insoluble and often incompatible functional ingredients of a cleaning product. Some hydrotropes are not surfactants but are used to solubilize complex formulations in water, but some anionic surfactants have hydrotroping capacity. They function to stabilize solutions, modify viscosity and cloudpoint, limit low temperature phase separation and reduce foam. Hydrotropes are amphiphilic substances composed of both a hydrophilic and a hydrophobic functional group. The hydrophobic part of the molecule is usually a benzene or alkyl benzene substituted apolar segment. The hydrophilic, polar segment is an anionic sulfonate group or groups accompanied by a counter ion (i.e., ammonium, calcium, potassium or sodium). It is often impossible to incorporate sufficient quantities of surfactants into the detergent system without the use of hydrotropes. Common hydrotropes are salts of xylene sulfonates and alkyl naphthalene sulfonates or alkylated diphenyl oxide disulfonates. Certain alpha-olefin sulfonates and alkyl ether sulfates and phosphate esters are anionic surfactants with hydrotroping ability as well as good detergents, emulsifiers or wetting agents.

Representative examples of selected hydrotropic surfactants useful in the inventive sodium silicate formulation or the polymer flocculant formulation might be sodium xylene sulfonate, alkyldipenyl oxide disulfonate ($R=C_{6-16}$). Many of the other surfactants often have hydrotroping properties. The solubility of phosphate esters is more limited than sulfonates in the highly electrolytic complex formulations of the invention. These hydrotrope surfactants may be incorporated in the sodium silicate formulations of the invention at concentrations ranging from 0.1 to 15 weight percent. More preferably, anionic surfactants may be incorporated in the sodium silicate formulations of the invention at concentrations ranging from 0.5 to 10 weight percent.

Cationic surfactants are surface-active compounds with at least one hydrophobic alkyl chain and a hydrophilic group carrying a positive charge. Quaternary ammonium compounds are characterized by a positively charged quaternary nitrogen atom. Commercial raw materials are normally derived from natural oils which implies that homologous mixtures of surfactants with different alkyl chain lengths are used in the most products. In household products, cationic surfactants are primarily applied in fabric softeners, hair conditioners, and other hair preparations. Other applications of cationic surfactants include disinfectants, biocides, emulsifiers, wetting agents, foaming agents, and processing additives. Because of their positive charge, cationic surfactants absorb strongly to the negatively charged surfaces of sludge, soil and sediments. Anionic and cationic surfactants used together in the same formulation are frequently incompatible. Common cationic surfactant groups are the alkyl amidopropylamines, alkyl ester ammonium salts, alkyl imidazoline derivatives, quaternised amine ethoxylates and quaternary ammonium compounds such as alkyl trimethylammonium salts, dialkyldimethylammonium salts, alkyldimethylbenzylammonium salts.

Representative non-limiting examples of selected cationic surfactants useful in the inventive polymer setting formulation might be cetyl trimethyl ammonium chloride, lauryl dimethyl benzyl ammonium chloride, cetyl pyridinium chloride and isodecyloxypropyldihydroxyethylmethyl ammonium chloride. These cationic surfactants may be incorporated in the acidic polymer formulations of the invention at concentrations ranging from 0.01 to 15 weight percent. More preferably, cationic surfactants may be incorporated in the acidic polymer formulations of the invention at concentrations ranging from 0.1 to 6.0 weight percent.

Polycarboxylates are homopolymers of acrylic acid or copolymers of acrylic acid and maleic anhydride, generally as sodium salts. They act as anionic surfactants. A representative example of a polycarboxylate might be Tersperse 2735 available from Huntsman Chemical Company in Salt Lake City, Utah or Sokalan CP-10 from BASF Corporation in Mount Olive, N.J. These polymers may be incorporated in the sodium silicate formulation of the invention to provide detergency and emulsification at concentrations ranging from 0.01 to 4.0 weight percent and more preferably from 0.1-2.0 weight percent.

Block copolymers consisting of long chains of EO and PO units are often used as nonionic surfactants. The block copolymers do not contain a hydrophobic moiety based on a fatty alcohol. Instead, the PO units function as the hydrophobic part establishing surface-active properties in combination with the more hydrophilic EO units. These products have limited solubility in the inventive sodium silicate formulations. However, the alkoxylated polyamine Poloxamine 904 known as Tetronic 904 from BASF Corporation is useful in the inventive sodium silicate formulation. These polymers may be incorporated in the sodium silicate formulation of the invention to provide detergency and emulsification at concentrations ranging from 0.01 to 2.0 weight percent and more preferably from 0.1-1.0 weight percent.

Co-solvents are frequently used in aqueous surfactant cleaning formulations to impart solubility of the components in the formulation and aid in enhancing the desorbtion of oily substances by dissolving them in the system. Co-solvents also work in conjunction with hydrotropes to solubilize surfactants that are difficult to retain in the solutions of the inventions. Examples of the most common co-solvents are glycols, polyglycols, and the many glycol ethers and glycol ether acetates available in the industry. However, the presence of these co-solvents in the inventive formulations may become a major contributor to Chemical Oxygen Demand (COD) because the co-solvents are more extractable (EPA 1311 TCLP) from the micro cell than the other surfactant additives. If COD is not an issue, these solvents may be incorporated in the formulated sodium silicate solution of the invention at concentration levels of 0.1 to 15 weight percent. More preferably, co solvents may be incorporated in the sodium silicate formulations of the invention at concentrations ranging from 1 to 6 weight percent. Incorporation of co-solvents often reduces the need for hydrotropes. Co-solvent use may be more economical than hydrotropes to provide stability in a formulation, however it is often best to formulate a stable system without either component. Due to the inert, solid nature of the micro encapsulated substance of the invention, the COD contribution to the environment is extremely low compared to other environmental technologies.

Polymers are useful in the acidic solution as a fixation or flocculation agent to assist in precipitating and binding the contaminant in the silicate matrix. Such polymers might be selected from any of the polyamines, polyacrylamides, polyimines and polydially dimethyl ammonium chloride (DADMAC) available from BASF or Kemira (formerly CYTEC) as paper sizing agents or flocculants. The concentration of the polyamine, polyimine and polyDADMAC polymers is between 0.01-4 percent by weight and preferably between 0.12 percent by weight.

The inorganic agents used for coagulation or setting in the acidic polymer formulation are chosen from the common agents such as calcium chloride and aluminum chlorohydrate. Numerous other coagulation agents could be used in the acidic polymer formulation of the invention such as: inorganic Ca, Mg, Na, K, Zn and Al salts of hydroxides, oxides, phosphates, sulfates borates, or carbonates; common inorganic mineral acids, common organic acids, organic esters, amides, carbonates, glycols or silanes and silicofluorides. The concentrations may range between 0.5-50 weight percent and more preferably between 3 to 30 weight percent.

The pH of the acidic polymer formulation may be controlled by the addition of an acid. The acids may be chosen from the mineral acids such as concentrated hydrochloric acid, sulfuric acid, phosphoric acid and the like or they may be chosen from organic acids such as acetic acid, oxalic acid, glycolic acid or any of the commonly used acids used to alter the pH of a system. A preferred acid being concentrated phosphoric acid used in the concentration range of from 0.1 to 10 weight percent.

Realize that all in all of the possible combinations and concentrations of surfactants or polymeric surfactants used for detergency, emulsification, wetting or hydrotroping and other additives for solvency in the presence of sodium or potassium silicate for the formulation of the invention, some will be stable and useful while others will be less preferred because of limited compatibility of the components in the formulation most often resulting in premature silica precipitation or lack of shelf stability resulting in a two-phase solution. Likewise, of all the possible combinations and concentrations of surfactants, polymers, coagulants, acids and the like for generating the solid microcapsules of the invention, some will be stable and useful while others will be less preferred because of limited compatibility of the components in the formulation resulting in premature precipitation of the setting agent(s) or lack of shelf stability resulting in a two-phase solution. Furthermore, of all the possible combinations and concentrations of the components of the silicate formulation and the polymer flocculation formulation, some will provide an excellent micro encapsulation of the contaminant while others will be less desirable due to efficiency, contaminant emulsification, syneresis of water or the liquid contaminant, water leachability, and the like. The micro encapsulation formulations of the invention are novel and provide unexpected performance in light of any previous prior art. The formulations of the micro encapsulation invention show unexpected stability to the detoxification agents when incorporated into the formulation as shown later in the spectral analysis of the byproducts of simulant oxidation.

Micro Encapsulation Process of the Inventive Composition for Hydrocarbons and Chemicals The micro encapsulation process of the invention for hydrocarbons and chemicals (without detoxification) occurs on a molecular level to form a complex inert amorphous silica matrix. The first component of the invention is an aqueous, alkaline, sodium silicate formulation to desorb and emulsify the contaminant into micelles. Specific surfactant packages can be tailored for specific treatments.

The second component of the micro encapsulation process of the invention (without detoxification) is a slightly acidic, aqueous, polymer formulation that rapidly reacts with the alkaline silicate formulation containing the contaminant to complete the micro encapsulation process. Within 10 seconds, microencapsulation begins and is observed as flocculated-precipitated agglomerates of polymer-silicate material with calcium-aluminum salts that contains the contaminant species inside the in-penetratable silica-polymer matrix. As time approaches one minute, the precipitated agglomerates firm up into a wet, fine-like sandy paste. The pH of the micro encapsulated material is in the neutral range. This micro encapsulation process removes the hazardous characteristics of this waste, such as ignitability, corrosivity, reactivity and toxicity. The micro encapsulated material is resistant to water penetration and leaching, and offers impressive long-term stability.

Since the first formulation of the invention is alkaline, the second formulation of the invention is acidic, and the desired pH of the resulting micro encapsulated wet composition targeted to be in the range of 6.5-7.5. The level of acidity of the acidic polymer formulation is designed to meet this requirement by making slight adjustments in the acid concentration.

In one application embodiment, the inventive micro encapsulation formulations may be applied by bulk addition, spraying or misting the silicate formulation on a contaminant coated surface. Mixing is vital to the quality of the micro encapsulate. The silicate formulation is designed to rapidly emulsify the hydrocarbon and optimally, the energy from spraying the silicate formulation onto the contaminant provides that energy. If this amount of energy is insufficient to form a milky emulsion, then a certain level of mechanical or manual agitation is necessary to complete the emulsification. Then the second acidic polymer component is applied immediately after emulsification by bulk addition or spraying onto the emulsified silicate contaminant mixture. Once again, at this stage mixing is vital to providing the optimum micro encapsulation result in the form of a homogeneous paste. The applications system consists of a portable unit with two tanks or drums of the two non-toxic aqueous formulations. Two individual spray systems are required because the two individual formulations when mixed together without the contaminant will form a micro encapsulated mass.

In another embodiment, the inventive micro encapsulation formulations may be diluted prior to application by bulk addition, spraying or misting on a contaminated soil as the soil is being mixed and processed through a device such as a pug mill. Water dilution of the two formulations up to one part formulation to two parts water prior to application allows for more efficient surface coverage of the soil without affecting the micro encapsulation performance. If the contaminant is spilled on a hard surface, the two formulations may effectively be diluted up to one part formulation to one part water without significantly affecting the resultant micro encapsulate. Since minor amounts of dilution do not effect performance, it is possible to apply the inventive micro encapsulation process on water wet surfaces or during periods of light rainfall. However, this is not to claim that the process can treat hydrocarbon spills on bodies of water.

The potential customers that may benefit from this technology is broad and diverse. They range from DoD, DOE, FAA, DOT, emergency response entities and any industrial manufacturing, transportation, storage or service industry that manufactures, consumes or handles hydrocarbons or chemicals and residential consumers.

CW Agent Detoxification by Nucleophilic Hydrolysis

Chemical hydrolysis reactions are commonly of two types: acid and alkaline. Acid hydrolysis is of negligible importance for CW Agent decontamination because the acid hydrolysis rate of most chemical agents is slow and adequate acid catalysis is rarely observed according to Wagner and Yang (U.S. Pat. No. 6,245,957 B1). Alkaline hydrolysis is initiated by the nucleophilic attack of the hydroxide ion on the phosphorus atoms in VX and the G-Agents. The alkaline hydrolysis rate is dependent on the chemical structure and reaction conditions. The rate increases sharply at alkaline pH values higher than 8.

G-Agents have a phosphoryl fluoride bond that is expected to be very similar in chemical reactivity to the phosphoryl chloride bond in diphenyl chlorophosphate (DPCP) simulant. Tabun, with a —CN group, might also behave similar to the —F or —Cl group. Halide and cyanide ions are known to be fairly good leaving groups in nucleophilic hydrolysis reactions. Therefore, G-Agent hydrolysis is rapid and DPCP, the simulant that most closely structurally related to the G-Agents, should react rapidly as well. If the simulant is acidic, such as DPCP, the first step in the neutralization is nucleophilic attack at the phosphorus atom and subsequent displacement of the chloride ion most likely via an $S_N2$ type mechanism as represented in Equation 1. One equivalent of an alkaline $OH^-$ nucleophile is required. The resulting products are sodium diphenylphosphonate and HCl. The HCl produced would require another equivalent of alkaline nucleophile for neutralization. Overall, two equivalents of nucleophile would be required for the first neutralization step according to the reaction shown in Equation 1.

Equation 1

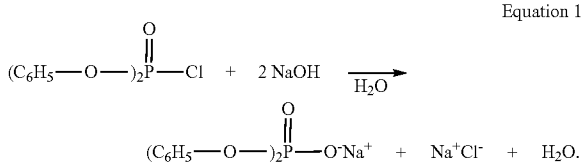

2-Chloroethylphenyl sulfide (CEPS), $C_6H_5SCH_2CH_2Cl$, is much different from DPCP mechanistically in terms of nucleophilic reactivity. The reaction is most likely considered an $S_N1$ nucleophilic mechanism with anchimeric (neighboring group) assistance. The first hydrolytic step with CEPS is the neighboring group nucleophilic attack of the sulfide S on the β-carbon to form an intermediate sulfonium ion as shown in Equation 2 (Giletto et. al. U.S. Pat. No. 6,569,353 and Curry et. al. U.S. Pat. No. 6,692,694). The reactant and the ion pair are in equilibrium and Equation 2 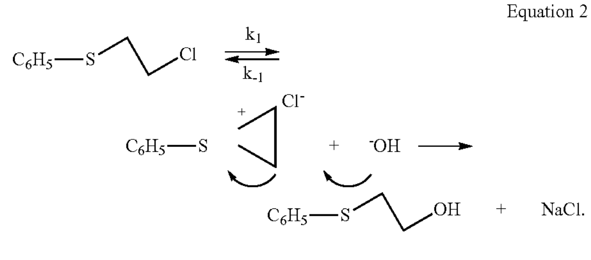 the observed reaction rate decreases with increasing chloride concentration. The hydroxyl nucleophile attacks the sulfonium ion at one of the ring carbons, opening the ring to give 2-hydroxyethylphenyl sulfide and sodium chloride.

Nucleophilic hydrolysis of VX is known to occur slowly according to Tadros and Tucker (U.S. Pat. No. 6,566,574). The hydrolysis products below pH 10 include EA2192, which is nearly as toxic as VX itself and longer lived. Thus, hydrolysis-based decontamination schemes are not an effective option against VX. Oxidation at the nitrogen and sulfur atoms is the method of choice for VX decontamination. Malathion was chosen as the simulant for VX and oxidation as the preferred destruction method. Hence, nucleophilic hydrolysis of VX was not attempted.

CW Agent Detoxification by Oxidation

Nucleophilic hydrolysis is only one mechanism for CW Agent detoxification. Oxidation is perhaps even more prominent. Bleaches and peroxides have been known for years to detoxify CW Agents. Numerous oxidant formulations have been used by the military for CW Agents such as super tropical bleach (93% calcium hypochlorite and 7% sodium hydroxide), potassium permanganate, hydrogen peroxide, and others.

Percarbonates

Precedence is found in the patent literature for the use of percarbonates, perborates and persulfates as improved active oxidizers (Giletto U.S. Pat. No. 6,569,353, Curry et. al. U.S. Pat. No. 6,692,694 and Tadros et. al. U.S. Pat. No. 6,566,574). More recently, Oxone (a mixture of $KHSO_5$, $KHSO_4$ and $K_2SO_4$ from Du Pont) has been used. Of the options available, it is the applicant's intent to focus more on the choice of sodium percarbonate and peracetic acid as the choice of oxidants to integrate into the inventive compositions.

Oxidizers are usually not shelf stable substances and when in contact with most other chemicals, they either react or decompose to produce oxygen. Therefore, oxidizers must be added to the inventive formulation just prior to use. This is actually beneficial, because it allows the base two-component formulation to be used for multi-purpose facility clean up and when a detoxifying formulation is required, the active agent may simply be mixed into the base formulation when needed. For example, sodium percarbonate may be added to the fully formulated sodium silicate composition since sodium percarbonate requires an alkaline medium and peracetic acid may be added to the fully formulated acidic polymer formulation since it requires an acidic medium for oxidation. If the alkaline silicate contains the detoxifying agent, it is added to the contaminant first, then the acidic polymer formulation without a detoxifying agent is added second for micro encapsulation purposes. Likewise, if the acidic polymer formulation contains the detoxifying agent, it is added to the contaminant first, then the alkaline silicate formulation without a detoxifying agent is added second for micro encapsulation purposes.

Sodium percarbonate ($2Na_2CO_3.3H_2O_2$) is a solid bleaching agent used in powdered laundry detergents and other cleaning products. Its effectiveness comes from the formation of the alkaline percarbonate ion and hydrogen peroxide in aqueous solutions as shown in Equation 3. Sodium percarbonate solutions remain active for 5 to 6 hours, after which they become inactive and are harmless. Likewise, when the acidic polymer component is added to the sodium silicate formulation with sodium percarbonate, any excess sodium percarbonate is neutralized and the by-products are harmless.

$$2Na_2CO_3.3H_2O_2+H_2O \rightarrow 2HCO_4^-+H_2O_2+H_2O+2Na^+ \quad \text{Equation 3}$$

The reaction stoichiometry with the simulants suggests the VX simulant, Malathion, would require the most additional oxygen for decomposition. A 12 percent by weight sodium percarbonate solution was prepared and aliquots of this solution were used in order to have a minimum of a two-fold excess percarbonate and hydrogen peroxide for initial simulant testing.

Peracetic Acid

Peracetic acid ($CH_3COOOH$) is a very strong oxidizing agent with a stronger oxidation potential than chlorine or chlorine dioxide as shown in Table 1. Peracetic acid is a clear, colorless liquid

TABLE 1

| Oxidation Capacity of Various Oxidizers | |
|---|---|
| Oxidizer | EV* |
| Fluorine | 3.05 |
| Ozone | 2.07 |
| Peracetic Acid | 1.81 |
| Hydrogen Peroxide | 1.78 |
| Potassium Permanganate | 1.68 |
| Chlorine Dioxide | 1.57 |
| Chlorine | 1.36 |
| Sodium Hypochlorite (1) | 1.36 |
| Bromine | 1.07 |

*electron volts (1) http://www.ams.usda.gov/NOP/NationalList/TAPReviews/PeraceticAcid3.pdf Chlorine bleach is a secondary substrate of chlorine that is most active at lower pH.

with no foaming capabilities, and has a strong pungent acetic acid (vinegar) odor. Peracetic acid is a mixture of acetic acid and hydrogen peroxide in an aqueous solution (Equation 4). It is a very strong oxidizing agent and has stronger oxidation potential than chlorine or chlorine dioxide.

Equation 4

$$CH_3C(=O)\text{—}OH + H_2O_2 \longrightarrow CH_3C(=O)\text{—}O\text{—}OH + H_2O.$$

Peracetic acid's primary use is as a sanitizer and disinfectant for food. Although peracetic acid is not explicitly listed as GRAS by FDA, it arguably benefits human health by controlling food-borne pathogens (J. P. Cherry, "Improving the Safety of Fresh Produce With Antimicrobials", *Food Technology,* 53: 54ff, 1999) and is widely used. When the sodium silicate component is added to the acidic polymer component containing peracetic acid for the purpose of micro encapsulation, any excess peracetic acid is neutralized and the by-products are harmless.

The most common commercial concentrations are between 5 to 15 percent. Peracetic acid has been used primarily as a sanitizer and water treatment compound in food and beverage processing, as a successful oxidizer for removing biofilms from food contact surfaces without a final rinse, as an outstanding odor suppressant, and as a bleaching agent. Although relatively new to the US for use in municipal water treatment, peracetic acid is an outstanding disinfectant, used successfully for over 15 years in other countries, to replace chlorination and as a UV disinfection supplement in secondary sewage treatment plants. Another of peracetic acid's unique advantages, is its very potent ability to oxidize sulfide molecules at all pH values associated with wastewater uses. The reaction is instantaneous and yields sulfate, which cannot combine with other entities to form further nuisance compounds. Disulfide molecules constitute the proteins in spore coats; hence the success described later in the examples of complete denaturation of *B. atrophaeus* and the sterne strain of *B. anthraxis* with peracetic acid. The reason for the excellent and rapid antimicrobial effect of peracetic acid is perhaps due to its specific ability to diffuse through the cell membrane. The high oxidation potential of the product results in the irreversible destruction of the system inside the cell with the result that the microorganism is destroyed. Thus, peracetic acid is a very broad-spectrum anti-microbial (bactericidal, fungicidal, sporicidal and viricidal) agent.

Peracetate Generation In Situ

The peracetate ion may be generated in situ using the peroxycarbonate ion with a bleach activator in a perhydrolysis reaction. Bleach activators may be esters, amides, imides, or anhydrides. They must have a perhydrolyzable acyls and a good leaving group such as oxybenzenesulfonate. Selection may vary with the advantages or deficiencies of particular bleach activators, such as low compatibility with additional components, limited storage stability, low mass efficiency, surfactant incompatibility, lack of biodegradability, and high cost. Bleach activators include: nonanoyloxybenzene sulfonate (NOBS) (Proctor & Gamble), sodium nonanoyloxybenzene sulfonate (SNOBS), tetraacetylethylenediamine (TAED), tetracetyl glycoluryl (TAGU), pentaacetylglucose (GAG), lauroyloxybenzene sulfonate (LOBS) and decanoyloxybenzenecarboxylic acid (DOBA). (U.S. Pat. No. 6,369,288, D. M. Davies et al J. Chem. Soc., Perkin Trans. 2, 1998)

The activator reacts with hydrogen peroxide or a hydrogen peroxide source such as the peroxycarbonate ion in alkaline aqueous solution, to form a peracid, typically a percarboxylic acid RC(O)OOH or its anion, with loss of a leaving-group, L, or its conjugate acid, LH. (Equation 10)

$$R\text{—}C(=O)\text{-}L+HCO_4^- \rightarrow R\text{—}C(=O)\text{—}OOH+LH+CO_2 \quad \text{Equation 10}$$

Since the peracetate anion generated via peroxycarbonate and a bleach activator is very similar to the peroxycarbonate anion, the mechanistic selectivity should be the same except further alkaline hydrolysis to the divinyl sulfoxide and divinyl sulfone may not occur.

Another attractive bleach activator is acetylsalicylic acid (aspirin) using sodium perborate as the peroxy compound (Kralovic et. al. U.S. Pat. No. 5,116,575 and U.S. Pat. No. 5,350,563) as shown in Equation 3. The uniqueness of this combination is that the by-products of the reaction between acetylsalicylic acid and sodium perborate are sodium metaborate, an inorganic corrosion inhibitor and salicylic acid, an organic corrosion inhibitor. Peracetic acid generated from aspirin and sodium perborate monohydrate are compatible with the slightly acidic, aqueous, polymer formulation of the invention. Peracetic acid generation by this means requires only a mater of a few minutes and provides a high level of CB Agent simulant or TIC detoxification prior to micro encapsulation. The advantage is the starting materials are safer to handle, transport with only minimal restrictions, and have good shelf lives.

$$o\text{-HO(O=C)}C_4H_6O(C=O)CH_3 + H_2O + NaBO_3 \rightarrow NaBO_2 + CH_3(C=O)OH + o\text{-HO(O=C)}C_4H_6OH \quad \text{Equation 3}$$

For either peracetic acid or in situ peracetic acid generation, field application could be as simple as adding a predetermined amount of peracetic acid or each of the solid precursors, such as aspirin and sodium perborate, together in water and add to the acidic polymer micro encapsulation component and mix.

In summary, there are several options or methods for generating the required peracetic acid in situ as a part of the inventive process. Generation at the time of need would be a preferred solution in that it would improve the logistics and shelf life of the detoxification additive.

G-Agents

The G-Agents most likely method of detoxification is nucleophilic hydrolysis. While G-Agents are decontaminated by a variety of oxidative solutions, they all are capable of alkaline hydrolytic neutralization and there is no evidence of exclusively oxidative decontamination reactions for G-Agents.

Competing hydrolyses of GB (Equation 5) with OH- and OOH-(peroxocarbonate) yields non-toxic isopropyl methylphosphonic acid (IMPA) and peroxy-IMPA respectively. The peroxy-IMPA is an intermediate, decomposing to IMPA with further consumption of $H_2O_2$ and evolution of $O_2$.

$$\text{(CH}_3)_2\text{CHO(CH}_3\text{—)P(=O)—F} + \text{OH}^- \text{ or OOH}^- \longrightarrow$$
$$\text{GB}$$
$$\text{(CH}_3)_2\text{CHO(CH}_3\text{—)P(=O)—O}^- + \text{HF.} \quad \text{Equation 5}$$
$$\text{IMPA}$$

Mustard

In aqueous alkaline solutions, sulfur mustard simulant CEPS is quickly hydrolyzed to the alcohol in a two-step reaction via Equation 2. In the presence of alkaline sodium percarbonate oxidant, the sulfur is most likely oxidized to the alcohol sulfoxide and/or sulfone as shown in Equation 6. The active oxidant species is thought to be the hydroperoxide anion $HO_2^{-1}$.

$$C_6H_5\text{—S—(CH}_2)_2\text{—OH} + HO_2^{-1} \longrightarrow$$
$$C_6H_5\overset{O}{\underset{}{\overset{\|}{\text{S}}}}\text{—(CH}_2)_2\text{—OH} + C_6H_5\overset{O}{\underset{O}{\overset{\|}{\underset{\|}{\text{S}}}}}\text{—(CH}_2)_2\text{—OH.}$$
Sulfoxide              Sulfone Equation 6

When peracetic acid is used as the oxidizing agent in the acidic micro encapsulation component, the CEPS is oxidized directly to the corresponding chloro sulfoxide and chloro sulfone products by the same hydroperoxide ion.

Mustard sulfoxide is extremely stable to hydrolysis and slightly toxic. Further oxidation under more severe conditions forms mustard sulfone, a relatively non-toxic compound Reference: (*Toxicological Profile for Sulfur Mustard-Update*, US Department of HHS September 2003. This document references Clark 1989; Price and Bullitt 1947; Rosenblatt 1975). Both the sulfoxide and sulfone are water soluble, different from Mustard. Mustard sulfone and mustard sulfoxide easily eliminates HCl under alkaline conditions to give divinylsulfone, which is highly toxic, and divinylsulfoxide, respectively, hence a preference for acidic oxidation mechanism.

Mustard oxidation with the peroxycarbonate ion (Equation 7) occurs quantitatively to the non-vesicant sulfoxide (HDO) instead of further oxidation to the sulfone ($HDO_2$). Contrary to Clark, Price and Bullitt (1947), and Rosenblatt (1975), Wagner (U.S. Pat. No. 6,245,957 B1) (Complete references at the front of this document) claims the sulfoxide is preferred to the sulfone, which is nearly as $$Cl\text{—CH}_2CH_2\text{—S—CH}_2CH_2\text{—Cl} \rightarrow Cl\text{—CH}_2CH_2\text{—S(=O)—CH}_2CH_2\text{—Cl} \quad \text{Equation 7}$$

potent a vesicant as mustard. Avoidance of sulfone production is of primary concern for an oxidant-based decontaminant, and the decontamination with percarbonate provides this critical selectivity. However, it is likely at high pH mustard undergoes a nucleophilic hydrolysis reaction to the corresponding alcohol prior to oxidation to the sulfoxide.

VX-Agent

VX-Agent is similar in structure and biological activity to some commonly used insecticides, such as Malathion, carbamates such as Sevin, and medicines such as Mestinon, Neostigmine and Antilirium. Wagner and Yang (U.S. Pat. No. 6,245,957 B1) claim that the reaction of percarbonate with VX provides a perhydrolysis mechanism as shown in the below (Equation 8).

$$C_2H_5O(CH_3\text{—})P(=O)SCH_2CH_2N(CH(\text{—}CH_3)_2)_2 + HCO_4^- \rightarrow C_2H_5O(CH_3\text{—})P(=O)O^- + ^-O_3SCH_2CH_2N(CH(\text{—}CH_3)_2)_2 \quad \text{Equation 8}$$

Exclusive cleavage of the P—S bond occurs to yield non-toxic ethyl methylphosphonic acid (EMPA), thus preventing formation of highly toxic EA-2192 (S-2-(diisopropylamino) ethyl methyl-phosphonothioc acid), which occurs via exclusive P—O bond cleavage. The cleaved thiol is oxidized to the sulfonate, consuming further hydrogen peroxide.

With Malathion as the simulant, the oxidants are envisioned to react with the P—S bond as shown in Equation 9 to form an intermediate. Once the S atom is oxidized, hydrolysis is very rapid to form a malonate sulfonate salt and O,O-dimethyl phosphorothioate salt.

Equation 9

$$\begin{array}{c} CH_3CH_2\text{—}O_2C \\ | \\ H_2C \\ | \\ HC\text{—}S\text{—}P \overset{O\text{—}CH_3}{\underset{\underset{S}{\|}}{\diagdown O\text{—}CH_3}} \xrightarrow{[O^-]} \\ | \\ CH_3CH_2\text{—}O_2C \end{array}$$

Malathion

-continued

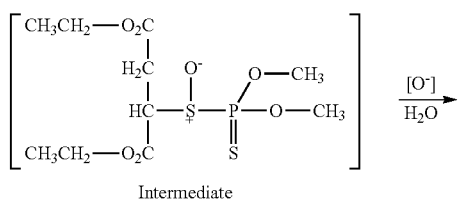

Intermediate

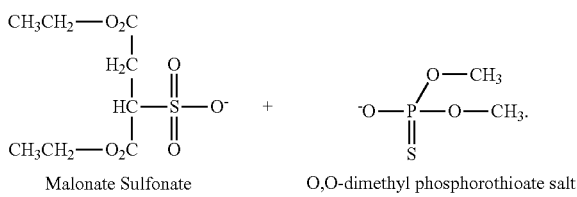

Malonate Sulfonate     O,O-dimethyl phosphorothioate salt

Example 1

Alkaline Sodium Silicate and Acidic Polymer Micro Encapsulation Formulations The compositions shown in Table 2 are representative of the sodium silicate formulations of the invention using different surfactant mixtures. All formulations perform well in the micro encapsulation of hydrocarbons and chemicals. Entries 1-5 are examples of sodium silicate micro encapsulation formulations of the invention. Entry 7 was the silicate formulation used for nucleophilic hydrolysis of CB Agents and oxidation using sodium percarbonate. Entry 6 is a preferred sodium silicate formulation for micro encapsulation and detoxification with peracetic acid for CB Agents followed by micro encapsulation. The compositions and manufacturers of the components are provided in Table 2A. The order of addition to prepare the sodium silicate formulations of the invention follows: Usually a small amount of the water (25 weight percent) is added to the anionic surfactant followed by the nonionic surfactant and a hydrotrope if required. The remaining water is added to the mixture and the sodium silicate is added last. Stirring is required to insure all components go into solution.

TABLE 2

Examples of Sodium Silicate Formulations of the Invention

| Component | Entry 1 Wt % | Entry 2 Wt % | Entry 3 Wt % | Entry 4 Wt % | Entry 5 Wt % | Entry 6 Wt % | Entry 7 Wt % | Entry 8 Wt % |
|---|---|---|---|---|---|---|---|---|
| Biosoft N-300 | | 4.00 | 4.00 | 4.00 | 4.00 | 2.00 | | |
| PolystepA-18S | 8.00 | | | | | | | |
| Avanel S74 | | | | | | 2.00 | | |
| Tersperse 2735 | | 1.00 | | | | | | |
| Tergitol NP-9 | | | | | 2.00 | | | |
| E-14-5 | | | | | | | 2.00 | |
| Amidox C-5 | | | 1.00 | | | | | |
| E-14-2 | | | | | | | 2.00 | |
| CSF | 4.00 | 4.00 | 4.00 | 4.00 | | | | |
| Stepanate SXS | | | | | 8.00 | | | |
| Amphoteric TC | | | | | | | | 4.00 |
| Dowfax C6L | | | | | | | 8.25 | |
| Tetraethylammonium hydroxide | | | | | | | 12.00 | |
| CPC | | | | | | | | 2.00 |
| Tetrasodium EDTA | | | | | | | | 2.00 |
| Water | 38.00 | 39.00 | 39.00 | 49.00 | 43.00 | 49.00 | 39.75 | 51.50 |
| N-Clear | 50.00 | 52.00 | 52.00 | 43.00 | 43.00 | 47.00 | 36.00 | 40.50 |
| Total | 100.00 | 100.00 | 100.00 | 100.00 | 100.00 | 100.00 | 100.00 | 100.00 |

TABLE 2A

Compositions of the Commercial Surfactants Used In the Sodium Silicate Formulation of the Invention

| Component | Surfactant Type | Company | Composition |
|---|---|---|---|
| Biosoft N-300 | Anionic | Stepan | Triethanolamine dodecylbenzene sulfonate |
| PolystepA-18-S | Anionic | Stepan | Sodium ($C_{14-16}$) olefin sulfonate |
| Avanel S74 | Anionic | BASF | Alkylpolyether sulfonate, R = $C_8$, EO = 3 |
| Tersperse 2735 | Anionic | Huntsman | Proprietary polycarboxylate |
| Tergitol NP-9 | Nonionic | Dow (UC) | Nonylphenolpolyethyoxyethanol EO = 9 |
| E-14-5 | Nonionic | Tomah | Poly(5)oxyethylene isodecyloxypropyl amine |
| Amidox C-5 | Nonionic | Stepan | Cocoamide 6EO |
| E-14-2 | Amphoteric | Tomah | Bis(2-hydroxyethyl)isodecyloxypropyl amine |
| Makam CSF | Amphoteric | McIntyre | Sodium Cocoamphopropionate |
| Amphoteric TC | Amphoteric | Tomah | Sodium isohexyloxypropyliminodipropionate* |
| Stepanate SXS | Hydrotrope | Stepan | Sodium xylene sulfonate |
| Dowfax C6L | Hydrotrope | Dow | Benzene 1,1'-oxybis-sec-hexyl deriv., sodium salts |

TABLE 2A-continued Compositions of the Commercial Surfactants Used In the Sodium Silicate Formulation of the Invention

| Component | Surfactant Type | Company | Composition |
|---|---|---|---|
| CPC | Quaternary Nucleophile | Zeeland SACHEM, Inc. | Cetylpyridinium chloride |
| Tetraethyl ammonium hydroxide | | | |
| N-Clear | Na Silicate | PQ Corp. | Sodium silicate, 42 Baume |

*The composition is believed to be as named. Tomah has not confirmed this composition.

The compositions shown in Table 3 are representative of the acidic polymer formulation of the invention used for the intended purposes of flocculating or coagulating the emulsified waste. Entry 1 is an acidic polymer formulation commonly used with silicate formulations containing lower silicate levels. Entry 2 is a common formulation used for micro encapsulation of hydrocarbons and chemicals with higher silicate concentrations. Entry 3 is a common formulation used for micro encapsulation of hydrocarbons and chemicals and is a preferred formulation for oxidation of CB Agents with peracetic acid. The preparation of the acidic polymer formulation of the invention is as follows: Calcium chloride is added to the water and stirred into solution on a magnetic stirrer. Then the surfactant is added followed by the acid and then the hydrotrope. The polymer solution and aluminum chlorohydrate are added

TABLE 3

Examples of Acidic Polymer Formulations of the Invention

| Component | Entry 1, Wt. Percent | Entry 2, Wt. Percent | Entry 3, Wt. Percent |
|---|---|---|---|
| Water | 71.35 | 58.72 | 57.72 |
| Calcium chloride | 6.00 | 6.00 | 6.00 |
| Cetylpyridinium chloride | | | 1.00 |
| Phosphoric acid (75%) | 1.25 | 8.00 | 8.00 |
| Sodium xylene sulfonate | 2.00 | 4.00 | 4.00 |
| PolyDADMAC | 0.40 | 0.48 | 0.48 |
| Aluminum chlorohydrate | 19.00 | 22.80 | 22.80 |
| Total | 100.00 | 100.00 | 100.00 | last. The following fluids shown in Table 4 were micro encapsulated using the sodium silicate formulation (Table 2 Entry 6) and the acidic polymer formulation of the invention (Table 3 Entry 2). The fluids were treated using equal parts silicate and polymer formulations by weight of the hydrocarbon fluid, allowed to air dry, TCLP extracted, and analyzed for leachable TPH. All results are considered to be very low levels of contaminant leachability.

TABLE 4

TCLP Results of Micro Encapsulated of Hydrocarbon Fluids

| Entry No. | Hydrocarbon | Leachable TPH, ppm |
|---|---|---|
| 1 | Used Motor Oil | <1 |
| 2 | Gasoline | <1 |
| 3 | Diesel, No. 2 | <1 |
| 4 | Crude Oil, Bartlesville Sand | <1 |
| 5 | Jet Fuel, JP-8 | <1 |
| 6 | Engine Lubricating Oil MIL-PRF-7808 | 3.84 |
| 7 | Calibration Fluid MIL-PRF-7024 | <1 |

TABLE 4-continued

TCLP Results of Micro Encapsulated of Hydrocarbon Fluids

| Entry No. | Hydrocarbon | Leachable TPH, ppm |
|---|---|---|
| 8 | Preservative Oil (1010) MIL-PRF-7024 | <1 |
| 9 | Aeroshell Grease MIL-G-21164 | 9.37 |
| 10 | Hydraulic Fluid MIL-PRF-83282 | 11.1 |
| 11 | Hydraulic Fluid MIL-PRF-5606, Used | 2.65 |
| 12 | BP Turbo Oil 2389 (SYN) MIL-PRF-7808 | 1.51 |

Example 2

A sample of used motor oil (UMO) was micro encapsulated using equal parts silicate (Table 2, Entry 6) and polymer formulations (Table 3, Entry 2) by weight of the used motor oil, allowed to air dry then TCLP extracted and analyzed by gc as shown in Table 5. The BTEX levels were reduced to below the limit of detection for the gc procedure. Most of the extractable metals were substantially reduced by the micro encapsulation process except for those metals like sodium and calcium present in the micro encapsulation formulations. Cadmium and chromium were present only at very low levels in the micro encapsulated UMO, but since the UMO was not acid digested, cadmium and chromium were below the limit of detection (0.250 ppm). Leachable lead was substantially reduced by micro encapsulation. Even though phosphorus was present in the micro encapsulation system, the level of phosphorus from the UMO was substantially lowered by micro encapsulation. This experiment demonstrates the benefit of micro encapsulation to reduce leachable organic chemicals and metals.

TABLE 5

BETX and Metals Testing in Micro Encapsulated Used Motor Oil.

| | Control, UMO | | Micro Encapsulated UMO | |
|---|---|---|---|---|
| Analyses | Result, ppm | *Limit, ppm | Result, ppm | *Limit, ppm |
| BTEX (SW8021B) | | | | |
| Benzene | 1.73 | 0.200 | ND | 0.0500 |
| Ethylbenzene | 65.8 | 0.500 | ND | 0.0500 |
| Toluene | 104 | 0.500 | ND | 0.0500 |
| Xylenes, Total | 376 | 1.50 | ND | 0.150 |
| Metals (ICP E200.7) | | | | |
| Aluminum | <1.25 | 1.25 | 3.43 | 0.0500 |
| Antimony | 0.450 | 0.250 | 0.0645 | 0.0100 |

TABLE 5-continued

BETX and Metals Testing in Micro Encapsulated Used Motor Oil.

| | Control, UMO | | Micro Encapsulated UMO | |
|---|---|---|---|---|
| Analyses | Result, ppm | *Limit, ppm | Result, ppm | *Limit, ppm |
| Boron | 28.2 | 1.25 | 0.643 | 0.100 |
| Cadmium | <0.250 | 0.250 | 0.188 | 0.00100 |
| Calcium | 5.77 | 1.25 | 396 | 5.00 |
| Chromium | <0.250 | 0.250 | 0.0321 | 0.0100 |
| Copper | 9.92 | 0.250 | 0.499 | 0.0100 |
| Iron | 11.5 | 1.25 | <0.0500 | 0.0500 |
| Lead | 1.64 | 0.125 | 0.326 | 0.00500 |
| Magnesium | 16.5 | 1.25 | 6.96 | 0.0500 |
| Potassium | 17.5 | 1.25 | 22.2 | 0.0500 |
| Sodium | <1.25 | 1.25 | 2,090 | 5.00 |
| Tin | 1.51 | 1.25 | <0.100 | 0.100 |
| Zinc | 33.4 | 0.250 | 10.5 | 0.10 |
| Phosphorus (M4500-P E) | 352 | 35.8 | 3.84 | 1.00 |

*Limit = Detection Limit

Example 3

A sample of micro encapsulated UMO produced with the inventive formulations (Table 2 Entry 6 and Table 3 Entry 3) was extracted according to the Multiple Extraction Procedure (MEP) EPA Method 1320 to establish the benefit of micro encapsulation technology for spills. This procedure is designed to simulate the leaching that a waste will undergo from repetitive precipitation of acid rain on an improperly designed sanitary landfill. The repetitive extractions reveal the highest concentration of each constituent that is likely to leach in a natural environment. The micro encapsulated samples are first extracted according to the Extraction Procedure Toxicity Test Method 1310 and analyzed for the constituents of concern. Then the solid portions of the extracted waste samples that remain after application of Method 1310 are re-extracted nine times using synthetic acid rain extraction fluid. If the concentration of any constituent of concern increases from the $7^{th}$ or $8^{th}$ extraction to the $9^{th}$ extraction, the procedure is repeated until these concentrations decrease.

In this experiment, the waste was UMO micro encapsulated with a ratio of 1/1/1 of the constituents UMO/alkaline sodium silicate/acidic polymer formulations of the invention. The sample was allowed to air dry before the initial extraction. The synthetic acid rain extraction fluid is made by adding an amount of a previously prepared 60/40 weight percent mixture of concentrated sulfuric acid/nitric acids to a large enough volume of deionized water to perform all extractions until the pH is 3.0+/−0.2.

The extract was analyzed for TPH Diesel (SW8015M), and BTEX (SW8021B). The results are tabulated in Table 6.

TABLE 6

Micro Encapsulated Used Motor Oil, MEP

| Extraction Number | TPH Result, mg/L | Benzene Result, mg/L | Toluene Result, mg/L | Ethyl benzene Result, mg/L | Xylenes Result, mg/L |
|---|---|---|---|---|---|
| 1 | ND | 0.0120 | 0.00900 | ND | ND |
| 2 | ND | ND | ND | ND | ND |
| 3 | ND | ND | ND | ND | ND |
| 4 | ND | ND | ND | ND | ND |
| 5 | ND | ND | ND | ND | ND |
| 6 | ND | 0.0210 | 0.0170 | 0.018 | 0.05 |
| 7 | ND | ND | ND | ND | ND |
| 8 | ND | ND | ND | ND | ND |
| 9 | ND | ND | ND | ND | ND |
| 10 | ND | ND | ND | ND | ND |

| Detection Limits: | TPH | 1 mg/L |
| | Benzene | 0.00500 mg/L |
| | Toluene | 0.00500 mg/L |
| | Ethyl benzene | 0.00500 mg/L |
| | Xylenes, Total | 0.0150 mg/L |

Example 4

Drill cuttings, 20.00 g, from an on-shore processing facility containing an oil based drilling mud were treated with 1.00 g of the sodium silicate solution of the invention (Table 2 Entry 6) and the acidic polymer formulation of the invention, (Table 2 Entry 2) in a beaker and mixed with a spatula. The mixture was allowed to dry at room temperature to a light gray color. The micro encapsulate was extracted using the EPA TCLP (Method 1311). The analysis (Diesel Range Organics) for Total Petroleum Hydrocarbons (TPH) was less than 1 ppm (below the detection limit).

Example 5

Nucleophilic Hydrolysis of CW Agent Simulants

A strong nucleophile, tetraethylammonium hydroxide, was formulated into the sodium silicate formulation of the invention shown in Table 2, Entry 7. The concentration of the nucleophile was selected using the titrimetric methods to establish an excess of the molar neutralization equivalent for the simulant DPCP. The following procedure was used for nucleophilic hydrolysis:

1. Add a known weight of simulant to an ultrasonic processing jar and start a timer.
2. Add 5.0 ml of the alkaline sodium silicate formulation of the invention containing the strong nucleophile (Table 2, Entry 7) to the jar and swirl.
3. After five minutes, add 7.0 ml of the acidic polymer formulation (Table 3 Entry 1) and mix with a spatula for 1 minute at which time the liquid immediately turns into a white thick paste. Use pH paper to adjust the pH into the pH 6-8 range with 0.5 ml of either formulation if necessary.
4. Add 55 ml of a 50/50 mixture of acetone and methylene chloride to quench any denaturing reaction.
5. Place the jar and its contents on a Pulsar Ultrasonic processor for 3 minutes to extract any un-reacted simulant and the reaction by-products from the mixture.
6. Filter the mixture over anhydrous sodium sulfate drying agent into a Turbovap tube.
7. Reduce the solvent mixture to one ml in the hot water (55° C.) Turbovap with a vacuum system.
8. Transfer the one ml of liquid mixture to a GC serum capped vial and add ten micro liters of internal standard by syringe.
9. Analyze by gas chromatography (gc) or gc-ms and compare retention times with internal standards and the known retention times of the simulants. The gc used was a HP5890 Series II instrument with a direct inject split/splitless purge & trap injector, an HP DB-5 megabore column, FID, PID or ECD detection, with HP Chemstation Enviroquant data analysis software. The gc analysis was often used to follow the reaction and absolute conclusive evidence was obtained using gas chromatography coupled with mass spectroscopy, gc-ms. The particular instrumentation used was an HP 6890 gc with a splitless injector, an HP DB-5 megabore column connected to HP 5973 ms equipped with a turbo pump with HP Chemstation Enviroquant data analysis software.

When the strong nucleophile was formulated into the sodium silicate formulation, DPCP was detoxified >99.995% (limit of detection, 50 ppm) within 5 minutes and CEPS was detoxified by 97.6% and 98.6% within 5 minutes and 15 minutes respectively (Table 7). Most of the detoxification probably occurred within the first few minutes of the experiments. As pH is reduced to neutral by the addition of the acidic polymer formulation, the reaction rate is greatly slowed. DMMP was much less reactive under these conditions and this time frame resulting in less than 50% detoxification.

TABLE 7

CWA Simulants Micro Encapsulated with a Nucleophilic Hydrolysis Component, Quenched and Extracted From the Microcell

| | Simulant | | |
|---|---|---|---|
| Quench Time | DPCP G-Agents | DMMP G-Agents | CEPS Mustard |
| Five (5) Minutes | >99.995% | <50% | 97.6% |
| Fifteen (15) Minutes | >99.995% | <50% | 98.6% |

The experiments were repeated on a larger scale in order to gain sensitivity on the gc-ms. The large scale experiment turned into a difficult task in the micro encapsulation process, but sensitivity was gained to 5 ppm for DPCP corresponding to >99.9995% denaturation. These results (Table 7A) for DPCP and CEPS simulant detoxification fall well within the boundaries of the Sandia Laboratory/Modec Inc. test results on live agents (Table 7A).

TABLE 7A

Results of Modec DF-200HF Foam Agent on Live Agent Testing.

| | Percent Destruction of Chemical Agent | | |
|---|---|---|---|
| Chemical Agent | 1 Minute | 15 Minutes | 60 Minutes |
| GD | 99.98 | 99.97 | 99.98 |
| VX | 91.20 | 99.80 | 99.88 |
| HD | 78.13 | 98.46 | 99.84 |

Example 6

Percarbonate Oxidation of CW Agent Simulants

Detoxification of the chemical simulants by oxidation using sodium percarbonate (Provox Sodium Percarbonate, OCI Chemical Corp., Decatur, Ala.) was very successful. The sodium silicate solution (Table 2, Entry 7) was further modified by adding 5.0 ml of 12 weight percent sodium percarbonate to the formulation prior to simulant addition.

1. Add a known weight of simulant to an ultrasonic processing jar and start a timer.
2. Add 10.0 ml of the alkaline sodium silicate formulation of the invention (Table 2 Entry 7) containing 5.0 ml of sodium percarbonate to the jar and swirled.
3. After five minutes, add 7.0 ml of the acidic polymer (Table 2, Entry 1) and mix with a spatula for 1 minute at which time the liquid turns into a white thick paste. Use pH paper to adjust the pH into the pH 6-8 range with 0.5 ml of either formulation if necessary.
4. Complete steps 4-9 of the procedure in Example 5.

The results are presented in Table 8. After 5 minutes, the DPCP was detoxified >99.995% and the G-Agent simulant DMMP was detoxified to 91.4%. The CEPS Mustard simulant was detoxified to 95.8% and Malathion to 96.9%. Additionally, Malathion showed a trend from 2, 5 and 10 minutes prior to quenching with 94.2%, 96.9% and 97.4% detoxification.

Once again, the important concept is that the reaction rate is unexpectedly rapid (1-2 minutes) and fairly complete after the sodium silicate percarbonate oxidation mixture of the invention is added to the simulant. This is very important when considering the extreme toxicity of the CW Agents. When the pH is neutralized by the addition of the acidic polymer formulation of the invention, the reaction rate is slowed substantially as any excess detoxification agent is rendered harmless.

TABLE 8

CW-Agent Simulants Detoxified with Sodium Percarbonate, Micro Encapsulated, Quenched, and Extracted From the Microcell

| | Simulant | | | |
|---|---|---|---|---|
| Quench Time | DPCP G-Agent | DMMP G-Agent | CEPS Mustard | Malathion VX-Agent |
| Two (2) Minutes | | | | 94.2% |
| Five (5) Minutes | >99.995% | 91.4% | 95.8% | 96.9% |
| Ten (10) Minutes | | | | 97.4% |

Example 7

Peracetic Acid Oxidation of CW Agent Simulants

Detoxification of the CW Agent simulants by using peracetic acid oxidation was equally successful when compared to the percarbonate oxidation. Peracetic acid was added to the acidic polymer formulation (Table 3 Entry 1) prior to simulant addition. The sodium silicate formulation (Table 2 Entry 7) was added to this mix as directed in the procedure as follows.

1. Add 4.0 ml of the acidic polymer formulation (Table 3 Entry 1) to a beaker.
2. Add 1.5 ml of 35 percent by weight peracetic acid (Sigma-Aldrich) to the beaker and swirl.
3. Start the timer and add known weights of DPCP, CEPS, DMMP, or Malathion (57% active) simulant to the beaker and swirl for one minute.
4. At the end of one minute, add 6.0 ml of the sodium silicate formulation Entry 7, Table 2 to the mixture and mix with a spatula for one minute at which time a solid microencapsulation mass results. Use pH paper and the 0.5 ml of either formulation to adjust if necessary the pH to the 6-8 range.
5. Complete steps 4-9 of the procedure in Example 4.

After 5 minutes, the G-Agent simulants DPCP and DMMP were detoxified to >99.995% and 87.0% respectively. (Table 9). The Mustard simulant CEPS was detoxified to 98.2% and Malathion to 98.2%. The Malathion experiment was repeated at 2 and 10 minutes prior to quenching as shown in Table 9 with 98.8%, 98.2% and 98.8% detoxification. Thus, the majority of detoxification occurred in the first two minutes. The previous trend toward reaction completion with time for Malathion in Table 9, if significant, was not upheld, but once again it is important to note the extremely rapid reaction rate.

TABLE 9

CW Simulants Micro Encapsulated With Peracetic Acid Oxidation, Quenched and Extraction From the Microcell

| Quench Time | Simulant: DPCP | DMMP | CEPS | Malathion |
|---|---|---|---|---|
| Two (2) Minutes | | | | 98.8% |
| Five (5) Minutes | >99.995% | 87.0% | 98.2% | 98.2% |
| Ten (10) Minutes | | | | 98.8% |

Example 8

Benefit of Micro Encapsulation Process for CB Agent Detoxification

There are several benefits of using a micro encapsulation delivery system with an oxidizer versus just applying an oxidizer detoxification agent alone to CB agents. Certainly, the oxidizer used alone would be expected to perform equally in the level of detoxification and has been proven to do so. To observe that the oxidizer mixture with one of the micro encapsulation components performs equally well is a plus. Most detoxification agents are not capable of complete detoxification of CW agents; therefore there is a residual presence of the CW agent. Furthermore, a second type of contaminant constitutes some of the by-products of oxidation of the CW agents that may be considered highly hazardous. These residual agents and by-products can present additional safety concerns and would require additional clean-up and disposal procedures in order to mitigate the hazard. Lastly, a significant issue with other decontamination products currently approved for use is that any oxidizer used in their system (i.e. chlorine dioxide, super tropical bleach, etc.) that is not totally consumed also constitutes a third contaminant type left in place. This residual oxidant represents a safety issue for personnel and a corrosion problem for equipment. Micro encapsulation of the residual contamination provides:

- A reduced level of toxicity exposure to all three contaminant types.
- Immediate neutralization of any residual oxidation agent to environmentally safe by-products.
- A solid form of waste that can be safely and easily recovered for further treatment or disposal.

Another benefit of the micro encapsulation system is that it provides a compatible delivery system for the detoxification agent. For example, certain surfactants serve to aid in exposing the biological toxant's DNA to the reactive compound. Some of these surfactants are actually known to have biocidal activity against certain pathogens. A possible mechanism for spore kill with the acidic polymer formulation system is the surfactants or solubilizers can act as a softening agent to disrupt the protein coat resulting in breeches whereby the peracetic acid can enter and attack the DNA.

The experiments in Examples 6 and 7 were repeated except the aggressive solvent extraction in Step 4 (Example 5) was replaced with a standard TCLP extraction procedure (EPA 1311) after air-drying the micro encapsulated material at room temperature. The aqueous acidic TCLP extracts were then extracted with methylene chloride/acetone, dried and analyzed.

All four of the simulants were oxidized with sodium percarbonate incorporated into the silicate formulation (Table 2 Entry 7) followed by micro encapsulation with the acidic polymer formulation (Table 3 Entry 1) in Series 1 of Table 10. Using the same procedure, peracetic acid was incorporated into the acidic polymer formulation (Table 3 Entry 1) as the oxidation agent in Series 2 followed by micro encapsulation as shown in Table 10. The samples were allowed to air dry and then extracted using the standard TCLP procedure (EPA 1311). The TCLP extracts were then extracted with methylene chloride/acetone for analysis of residual simulant. Series 3 is a duplicate of the Series 1 experiment performed by an outside laboratory, Green Country Testing in Tulsa, Okla., which was in excellent agreement. The results of the oxidations with subsequent micro encapsulation of any residual simulant and the by-products of detoxification were all significantly improved when compared with the data in Tables 8 and 9. The worst case result for DMMP was 99.933% as compared to 87.0% in Table 9 (detection limit 10 ppm). The benefit of micro encapsulation is demonstrated by the fact that the level of toxicity was further reduced in most of the results to below the level of detection (10 ppm) in Table 10. The residual simulants were simply not extractable under these conditions. Micro encapsulation using the formulations of the invention provides additional level of protection from the toxicity of any residual CW-Agents. As silica microcapsules dehydrate, the silica shrinks in an irreversible manner, the packing density is increased and the pore diameters are diminished, firmly holding the contaminants in place [Ralph K. Iler, *The Colloid Chemistry of Silica and Silicates*, Cornell University Press, Ithaca, N.Y., 1955, p 140-141].

TABLE 10

The Benefit of Micro Encapsulating the Residual By-Products of Chemical Agents.

| Quench Time = 5 Minutes | Simulant | | | |
|---|---|---|---|---|
| Oxidant Series | DPCP | DMMP | CEPS | Malathion |
| Series 1. Sodium Percarbonate | >99.999% | 99.955% | 99.985% | >99.999% |
| Series 2. Peracetic Acid | >99.999% | 99.933% | >99.999% | >99.999% |
| Series 3. Sodium Percarbonate | >99.999% | 99.935% | 99.954% | >99.999% |

Further tests with dimethylmethylphosphonate (DMMP) were not be conducted as it was established DPCP more closely resembles the G-agents because the $Cl^-$ ion is a better leaving group than —$OCH_3$. Giletto et. al. U.S. Pat. No. 6,569,353 used the same poor leaving group argument in his observations.

Example 9

CW Agent Detoxification and By-Product Analysis Using gc-ms

The most preferred alkaline silicate and acidic polymer formulations are shown in Table 2 Entry 6 and Table 3 Entry 3 respectively for "Dual-Use" application. Similar experiments using gc-ms analysis show that the simulants (DPCP, CEPS and 96 percent Malathion) are all oxidized to by-products extending beyond the limits of detection >99.999% (<10 ppm). Even though the results are beyond the limit of detection of 10 ppm for the gc-ms procedure, the benefits of micro encapsulation are still anticipated.

In all cases with peracetic acid as the oxidation agent, the optimum micro encapsulation results were obtained within the five-minutes or less, which is of great significance. Any oxidation experiments greater than 5 minutes show evidence of oxidation of some of the components of the formulations. The procedure for these experiments is as follows:

1. Add 5.0 ml of the acidic polymer formulation and 0.40 ml of the 35% peracetic acid to an ultrasonic processing jar. Swirl until homogeneous.
2. Start the timer and immediately add 0.25 g of simulant to the mixture with swirling for one minute. Set the mixture aside until five or thirty minutes total time has elapsed.
3. At the end of five or thirty minutes, add 7.0 ml of alkaline sodium silicate formulation to the solution and mix with a spatula for one minute at which time a solid micro encapsulation mass results. Use pH paper and the 0.5 ml of either formulation to adjust the pH to the 6-8 range.
4. Repeat Steps 4-9 in Example 5.
5. Analyze by gc-ms. The instrumentation used was an HP 6890 gc with a splitless injector, an HP DB-5 megabore column connected to HP 5973 ms equipped with a turbo pump with HP Chemstation Enviroquant data analysis software.

Spectroscopy is used to identify the composition of organic compounds. Normally a combination of mass spectroscopy (ms), nuclear magnetic resonance spectroscopy (nmr), infrared spectroscopy (ir) and maybe ultra violet spectroscopy (uv) are used to absolutely determine the identity of a pure compound. In this effort, gc-ms are used to separate a complex mixture into components. The disappearance of the simulant peak at a given retention time is used to assess the level of detoxification success. Interpretation of the individual peaks in the ms is used to assess the identity of the reaction products along with knowledge of the anticipated products that are formed and how well the data matches the ms library scan of the pure product. This analysis only holds true to the extent of the oxidation by-product's solubility in the methylene chloride-acetone extraction solvent used for the gc-ms analysis. Those compounds insoluble in methylene chloride of course do not appear in the gc-ms analysis. However, combining the knowledge of the quantitative disappearance of the original simulant with the identification of the majority of the reaction by-products expected yields information as to the success of the detoxification process.

Mass Spectroscopic Analysis of G-Agent Simulant DPCP

The simulant DPCP was oxidized with a peracetic acid and the by-products of the mixture were micro encapsulated after 5 minutes and extracted with methylene chloride and acetone. Simulant destruction was greater than 99.999 percent (limit of detection=10 ppm). Anticipated oxidation products of DPCP are: Diphenyl phosphate, $(C_6H_5O)_2P(O)OH$ (molecular weight (Mwt) 250 g/mole), Phenylphosphoric acid, $C_6H_5OP(O)(OH)_2$ (Mwt 174 g/mole) and Phenol, $C_6H_5OH$ (Mwt 94 g/mole). The only by-product identified in the mass spec was phenol. It appears DPCP was thoroughly oxidized by the formulations of the invention. Many of the anticipated by-products of DPCP could be in the form of phosphates or phosphate salts that are insoluble in the methylene chloride/acetone mixture.

Mass Spectroscopic Analysis of Mustard Simulant CEPS

The simulant CEPS was oxidized with a peracetic acid and the by-products of the mixture were micro encapsulated after 5 minutes and extracted with methylene chloride and acetone. Simulant destruction was greater than 99.999 percent (limit of detection=10 ppm). Anticipated oxidation products of CEPS are: 2-chloroethylphenyl sulfoxide $C_6H_5S(O)CH_2CH_2Cl$ (Mwt 188 g/mole), 2-chloroethylphenyl sulfone $C_6H_5S(O)_2CH_2CH_2Cl$ (Mwt 204 g/mole), phenylvinyl sulfone $C_6H_5S(O)_2CH=CH_2$ (Mwt 168 g/mole), benzene sulfonyl chloride $C_6H_5SO_2Cl$ (Mwt 176 g/mole). 2-Chloroethylphenyl sulfone and benzene sulfonyl chloride are among the major by-products of CEPS oxidation. The sulfoxide products that were not identified were undoubtedly produced as an intermediate, but upon further oxidation produced the corresponding sulfones. Phenylvinyl sulfone would more likely form in an alkaline hydrolysis than an acidic hydrolysis reaction. Unanticipated oxidation products that could possibly be identified as: 2-Chlorovinylphenyl sulfone $C_6H_5S(O)_2CH=CHCl$ (Mwt 202 g/mole), Chloromethylphenyldisulfonoxide $C_6H_5S(O)_2S(O)CH_2Cl$ (Mwt 238 g/mole), Diphenyldisulfide $C_6H_5SSC_6H_5$ (Mwt 218 g/mole), and Benzene sulfonothioic acid, S-phenyl ester $C_6H_5S(O)_2SC_6H_5$ (Mwt 218 g/mole) were detected. None of the micro encapsulation components of the invention were identified in the CEPS oxidation although one unknown peak also identified in DPCP was present.

Mass Spectroscopic Analysis of VX Simulant Malathion

The simulant Malathion (96%) was used for the VX-Agent was oxidized with a peracetic acid and the by-products of the mixture were micro encapsulated after 5 minutes and extracted with methylene chloride and acetone. Simulant destruction was greater than 99.999 percent (limit of detection=10 ppm). Anticipated oxidation products of Diethyl succinate $C_2H_5CO_2CH_2CH_2CO_2C_2H_5$ (Mwt 174 g/mole), Diethylfumarate trans or $E-C_2H_5CO_2CH=CHCO_2C_2H_5$ (Mwt 172 g/mole), 2-hydroxydiethyl butanediaoate, $C_2H_5CO_2CH_2CH(OH)CO_2C_2H_5$ (Mwt 190 g/mole), and a malonate sulfonate salt $C_2H_5CO_2CH(S(=O)_2O^-)CH_2CO_2C_2H_5$ (Mwt 253) were among the by-products of Malathion oxidation identified. The presence of the malonate sulfonate salt is evidence strongly suggesting the cleavage of the P—S bond to form degradation products of lower toxicity than the P—O bond. In the case of VX-Agent, exclusive cleavage of the P—S bond occurs to yield non-toxic ethyl methylphosphonic acid (EMPA), thus preventing formation of highly toxic EA-2192 (S-2-(diisopropylamino)ethyl methyl-phosphonothioc acid), which occurs via exclusive P—O bond cleavage. Maloxon was not present because the peracetic acid oxidation was too harsh and oxidation went beyond that stage. Maloxon is often detected as a by-product of alkaline oxidation.

Example 10

Biological Agent Denaturation and Micro Encapsulation Results in Neat Solution

The purpose of this testing was to determine the effectiveness of the inventive compositions without the oxidation agent added just prior to use in the alkaline silicate formulation of the invention, Table 2 Entry 8, and a acidic polymer formulation of the invention Table 3, Entry 1. The denaturation reaction was stopped after a period of time by diluting the solid micro encapsulation residue with sterile water followed by extraction. Each of these assays were evaluated using established microbiological methods for obtaining bacterial culture cell counts by the method of serial dilution.

The method of serial dilutions allows for the extract sample to undergo successive dilutions. A small amount of each of the diluted bacteria samples is then spread onto an agar plate made from sterile broth. The numbers of spore colonies that grow on each plate are counted after an incubation period. By working backwards using multiplication with the "dilution factor" a determination of the number of spores in the original sample is made. The initial spore concentrations were determined from the colony counts obtained from positive controls completed in triplicate. The assayed spore concentration for the control and samples are representative of the spores contained in the suspension before dilution. The survival percentage was determined for each sample.

Hydrolysis Procedure with BW Agent Simulant

A sodium silicate formulation of the invention containing cetylpyridinium chloride, tetrasodium ethylen ediamine tetraacetate, and an amphoteric surfactant, Amphoteric TC (Table 2 Entry 8) was used to detoxify an anthrax simulant. Cetylpyridinium chloride is stable in alkaline systems in the absence of anionic surfactants. The acidic polymer formulation of the invention used is shown in Table 3 Entry 1.

The spores of organism *Bacillus atrophaeus* (formerly *Bacillus subtilis* var. *niger*, ATCC 9372) anthrax simulant were suspended in sterile deionized water. The control spore population was determined by established procedures to be $4.33 \times 10^7$ spores ml$^{-1}$. This number was used for comparative analysis with each of the samples assayed. The time (Step 4 of the procedure) between addition of the sodium silicate formulation and quenching were 2, 5, 15, and 60 minutes respectively. Then, the samples were diluted with sterile deionized water and plated on brain-heart infusion agar and incubated at 30° C. for 48 hours. The procedure for denaturation follows:

1. Add 1.0 ml of the spore suspension to a beaker and start a timer.
2. Add 5.0 ml of the alkaline sodium silicate formulation of the invention to the beaker and swirl.
3. At a predetermined time interval (1, 4, 14, and 59 minutes), add 5.0 ml of the acidic polymer formulation and mix with a spatula for 1 minute at which time the liquid turns into a white thick paste. Use pH paper and the 0.5 ml of either formulation to adjust the pH to the 6-8 range.
4. Add 10 ml of sterile deionized water to the mixture and transfer to a 15 ml Flacon tube.
5. Place the Falcon tube on a Vortex Genie 2 shaker and vigorously shake for 30 seconds as a homogeneous distribution of the paste particles is observed.
6. Make serial dilutions (from 1,000 to 10,000,000) of the initial suspension (control) and the experimental mixtures in sterile deionized water.
7. Transfer aliquots onto brain-heart infusion agar and incubate at 30° C. for 24 hours.
8. Observe the plates, count the colonies and compare with the controls.

As shown in Table 11, all Entries had a 95% spore kill (1.5-log$_{10}$ reduction). The data in Table

TABLE 11

Spore Kill Efficiency vs. Time on Micro Encapsulation Formulations of the Invention.

| Entry No. | Time (minutes) | Reduction in Spores, % | Log Reduction in Spores |
|---|---|---|---|
| 1 | 2 | 94.63 | 1.5 |
| 2 | 5 | 95.70 | 1.6 |
| 3 | 15 | 95.59 | 1.6 |
| 4 | 60 | 95.13 | 1.6 |

11 was very promising and somewhat better than the original test by an out side government official with the formulations of U.S. Pat. No. 5,678,238 cited earlier, but the level of denaturation with time did not change. To be useful in BW-Agent defeat, significant improvements are required.

Slight modifications to the sodium silicate formulation of the invention (Table 1, Entry 8) were made to reduce the cetylpyridinium chloride and Na$_4$EDTA concentrations from 2.00 weight percent to 1.00 weight percent each and another biocidal agent, trichloromelamine, was incorporated at 0.025 weight percent. The acidic polymer formulation is shown in Table 2, Entry 1. The procedure above was repeated at 2 and 15 minute exposure times. The assayed spore population was $7.08 \times 10^9$ spores 0.8 ml$^{-1}$. A slight improvement was observed to 98.79% and 98.82% denaturation respectively for the two exposure times.

Example 11

The most preferred formulations of the invention for CB Agents, TICs and TMs incorporate the components for the sodium silicate formulation (Table 2 Entry 6) and for the acidic polymer formulation (Table 3 Entry 3) for the "dual use" system were evaluated for oxidative detoxification of BW Agent spore simulants. The acidic polymer formulation was tested at various concentrations of peracetic acid added just prior to spore treatment in the experiments shown in Table 12 according to the procedure for bulk detoxification similar to that used in Example 10.

Bulk Detoxification

The spore form of the bacteria *B. atrophaeus* ATCC 9372 was used as the surrogate for gram-positive anthrax simulant. It was suspended in sterile deionized water. The control spore population of *B. atrophaeus* was determined to be $2.743 \times 10^8$/0.1 ml and after dilution $1.09 \times 10^7$ spores per 0.1 ml. The denaturing effectiveness on *B. atrophaeus* was determined after five minutes exposure to the varying concentrations of peracetic acid/acidic polymer formulation. The concentration of peracetic acid (Aldrich) used was 32 percent by weight and the acidic polymeric formulation contained a sporicidal surfactant. The reaction was quenched with the sodium silicate formulation to quickly terminate any excess oxidative capacity of the peroxy acid. The micro encapsulated residue was diluted with sterile water for extraction. The method of serial dilutions allows for the extract sample to undergo successive dilutions. A small amount of each of the diluted bacteria samples is then spread onto an agar plate made from sterile broth. The number of spore colonies that grow on each plate are counted after an incubation period. By working backwards using multiplication with the "dilution factor" a determination of the number of spores in the original sample is made. The initial spore concentrations were determined from the colony counts obtained from positive controls completed in triplicate. The assayed spore concentration for the control and samples are representative of the spores contained in the suspension before dilution. The survival percentage was determined for each sample.

Entries 1 through 5 in Table 12 were completely denatured (zero spores remaining) with the peracetic acid/acidic polymer formulation and micro encapsulated with the sodium silicate of the invention. But because of definition, the spore kill was a level of log 7 spore reduction defined as 99.99999 percent. The peracetic acid concentration at 0.20 ml effectively denatured 0.5 ml of simulant. Higher concentrations of the alkaline silicate formulation were required to neutralize the excess acid. Since the agar plates had no indication of spore colonies, they were incubated another 24 hours and checked only to find the absence of any spores.

TABLE 12

Denaturation and Micro Encapsulation of Bacillus atrophaeus Solution.

| | Entry Number | | | | | |
|---|---|---|---|---|---|---|
| | 1 | 2 | 3 | 4 | 5 | Control* |
| Acidic Polymer Formulation, ml | 5.4 | 5.2 | 5.4 | 5.8 | 0 | 0.0 |
| 35% Peracetic acid, ml | 0.40 | 0.20 | 0.40 | 0.80 | 0.40 | 0.0 |
| Bacillus atrophaeus, ml | 0.10 | 0.50 | 0.50 | 0.50 | 0.10 | 0.10 |
| Sodium Silicate Formulation, ml | 7 | 7 | 7 | 9 | 0 | 0.0 |
| Time, minutes | 5 | 5 | 5 | 5 | 5 | |
| Bacillus, % Remaining | 0 | 0 | 0 | 0 | 0 | $1.09 \times 10$&/0.1 ml |
| Log Kill | 7 | 7 | 7 | 7 | 7 | 0 |

*After appropriate dilution.

Surface Detoxification

In a similar manner the spores of organism B. atrophaeus, ATCC 9372 anthrax simulant were suspended in sterile deionized water and used to contaminate surfaces. A small quantity (0.02 ml) of B. atrophaeus was spotted on the surfaces of a 1×2 inch samples of glass, wood and carpet. The surface was treated with approximately 5.0 ml of acidic polymer formulation (Table 3 Entry 3) curing agent containing 0.40 ml of peracetic acid using a pump bottle sprayer capable of delivering a fine spray. After 5 minutes, approximately 7.0 ml of alkaline silicate formulation (Table 2 Entry 6) was sprayed on the surface with a second pump sprayer to quench the oxidant and complete the micro encapsulation. The micro encapsulated denatured B. atrophaeus and any non-denatured bacillus was washed from the surface using 100 ml of deionized water by immersing the object in the water, sealing the container and shaking. The sample was plated on brain-heart infusion agar and incubated at 30° C. for 24 hours. The number of viable spores in the original solution was $2.10 \times 10^9$ ml$^{-1}$. The control spore population was determined as $4.19 \times 10^7$ spores per 0.02 ml$^{-1}$. As shown in Table 13, Entry Numbers 1-3 had 100% spore kill to a level of log 7 spore reduction. There were no live spores to count after incubation. As a control, 0.02 ml of B. atrophaeus was spotted on an each of the three surfaces and then washed from that surface (without oxidation and micro encapsulation) with denatured water in a similar fashion to establish the level of recovery, which was very good in all three experiments.

TABLE 13

Denaturation and Micro Encapsulation of B. atrophaeus on Surfaces.

| | Entry Number | | |
|---|---|---|---|
| | 1 | 2 | 3 |
| | Contaminated Material | | |
| | Glass | Wood | Carpet |
| TERRACAP 4000, ml | 5 | 5 | 5 |
| 35% Peracetic acid, ml | 0.40 | 0.40 | 0.40 |
| Bacillus atrophaeus, ml | 0.02 | 0.02 | 0.02 |
| TERRACAP 3000, ml | 7 | 7 | 7 |
| Time, minutes | 5 | 5 | 5 |

TABLE 13-continued

Denaturation and Micro Encapsulation of B. atrophaeus on Surfaces.

| | Entry Number | | |
|---|---|---|---|
| | 1 | 2 | 3 |
| | Contaminated Material | | |
| | Glass | Wood | Carpet |
| Bacillus, % Remaining | 0 | 0 | 0 |
| Log Kill | 7 | 7 | 7 |
| Control Spore Determination | $5.23 \times 10^7$ | $3.78 \times 10^7$ | $2.33 \times 10^7$ |

Live Agent Detoxification with the Sterne Strain of B. anthracis.

In December 2006, testing was conducted at the Division Human Effectiveness Directorate Air Force Research Laboratory in San Antonio, Tex. under the direction of Dr. Johnathan Kiehl to verify the above results in Example 9 against the Sterne strain of B. anthracis. The test results confirmed the "dual use" micro encapsulation system comprising the most preferred formulations of the invention for CB Agents, TICs and TMs incorporate the components for the sodium silicate formulation (Table 2 Entry 6) and for the acidic polymer formulation (Table 3 Entry 3) with peracetic acid achieved a log 7 reduction ($10^7$ challenge) on all variations tested in Table 12. The exposure time was 5 minutes for all samples tested. A formal report was received.

Example 12

Perchloroethylene is a hazardous persistent chemical and falls under the category of a TIC. The "dual use" micro encapsulation system of the invention comprising the most preferred formulations of the invention for CB Agents, TICs and TMs incorporate the components for the sodium silicate formulation (Table 2 Entry 6) and for the acidic polymer formulation (Table 3 Entry 3) with peracetic acid using peracetic acid was used to oxidize the toxic perchloroethylene to by-products. Perchloroethylen was oxidized to a residual of 450 ppm (99.861% oxidized) after 30 minutes and 330 ppm residual (99.898% oxidized) after 1.5 hours. This implies that the "dual use" micro encapsulation system of the invention using peracetic acid or another detoxifying agent could be used for spills of chlorinated hydrocarbons and other TICs or possibly even near surface or subsurface remediation of TIC contamination.

These examples demonstrate excellent results obtained using nucleophilic hydrolysis, alkaline oxidation and acidic oxidation mechanisms for detoxification. This demonstrates the novel utility and "distinguishing characteristics" of the "dual use" micro encapsulation system for detoxification of hazardous substances. Nucleophilic hydrolysis alone is not as versatile as the oxidative approach for G, VX and Mustard Agents and nucleophilic hydrolysis has the potential for creating highly hazardous by products with VX. Acidic oxidation with peracetic acid has demonstrated excellent results in terms of log kill levels with the anthrax simulant and high levels of detoxification success with CA simulants with in two to five minutes exposure times.

Although the invention has been illustrated by the preceding examples, it is not to be construed as being limited to the materials employed therein, rather the invention is directed to the generic area as hereinbefore disclosed. Various modifications and embodiments can be made without departing from the spirit or scope thereof.

What is claimed is:

1. A two-part formulation derived from water based solutions having the ability to micro encapsulate hydrocarbons and chemicals, comprising:
   a. a first solution comprising water and a predetermined ratio of a water soluble alkaline silicate solution having at least one alkali metal and a predetermined ratio of at least one water soluble surfactant, and;
   b. a second solution comprising water;
      a predetermined ratio of water soluble acid;
      a predetermined ratio of water dispersible polymer;
      a predetermined ratio of water soluble hydrotrope;
      a predetermined ratio of at least one water soluble flocculating agent.

2. The two-part formulation of claim 1, further comprising a predetermined ratio of at least one water soluble quaternary surfactant agent; and a predetermined ratio of water soluble activating agent.

3. The two-part formulation of claim 1 wherein the first solution contains at least one alkali metal that is selected from either sodium or potassium.

4. The two-part formulation of claim 3 wherein said first solution further comprises:
   between approximately 30 and 55 parts active silicate per hundred parts of solution;
   a molar ratio of silicon dioxide to said at least one alkali metal in the range from approximately 2:1 to approximately 3.5:1;
   wherein the pH of said first solution is from approximately 10 to 13; and
   wherein alkali metal silicate is present in said solution in a concentration between approximately 20 and 60 percent by weight.

5. The two-part formulation of claim 1, wherein the first solution contains alkali metal silicate and contains at least one surfactant that is selected from anionic, nonionic, polymeric, or amphoteric type surfactants, wherein each of said at least one surfactant is present in the first solution in a concentration between approximately 0.1 to 15 percent by weight.

6. The two-part formulation of claim 1, wherein said second solution further comprises water soluble acid that is selected from the group consisting of mineral or organic acids.

7. The two-part formulation of claim 6 wherein said water soluble acid is selected from a group consisting of phosphoric acid or acetic acid.

8. The two-part formulation of claim 7 wherein said water soluble acid is present in the second solution in a concentration between approximately 0.1 and 15 percent by weight.

9. The two-part formulation of claim 1, wherein said second solution further contains a water dispersible polymer that is selected from the group consisting of polyamines, polyacrylamides, polyimines and polydially dimethyl ammonium chloride.

10. The two-part formulation of claim 9 wherein said water dispersible polymer is present in a concentration between approximately 0.1 and 15 percent by weight.

11. The two-part formulation of claim 1, wherein the second solution also contains at least one water soluble hydrotrope selected from the group consisting of xylene sulfonates, alkyl naphthalene sulfonates, alkylated diphenyl oxide disulfonates, alpha-olefin sulfonates, alkyl ether sulfates and phosphate esters in a concentration between about 0.5 and 10 percent by weight.

12. The two-part formulation of claim 1, wherein said second solution further comprises at least one water soluble flocculation agent selected from the group consisting of aluminium chlorohydrate, calcium chloride, or other metal salts, acids, acid hydrolyzable substances, or silanes present in a concentration between approximately 5 and 65 percent by weight.

13. The two-part formulation of claim 1, wherein said second solution further comprises at least one water soluble surfactant.

14. The two-part formulation of claim 13 wherein said at least one water soluble surfactant is a cationic surfactant selected from the group consisting of tetrabutyl ammonium bromide, benzalkonium chloride, benzethonium chloride or cetylpyridinium chloride in a concentration between approximately 0.1 and 10 percent by weight.

15. The two-part formulation of claim 1 wherein said second solution further comprises an activating agent.

16. The two-part formulation of claim 15 wherein said activating agent is ethylenediaminetetraacetic acid present in the second solution in a concentration between approximately 0.1 and 10 percent by weight.

17. The two-part formulation of claim 1, wherein said first solution further comprises at least one water soluble detoxifying agent, said water soluble detoxifying agent is selected from the group consisting of strong nucleophiles, hydrolyzing agents or oxidants such as tetraethyl ammonium hydroxide, sodium or potassium hydroxide, sodium percarbonate, sodium perborate, or components to generate oxidants in situ, present or added to the first solution in a concentration of about 0.1 to 10 percent by weight.

18. The two-part formulation of claim 1, wherein said second solution further comprises at least one water soluble detoxifying agent, said detoxifying agent is selected from the group consisting of peracetic acid, other peroxo acids, or components to generate peroxo acids in situ, in a concentration from approximately 0.1 to 10 percent by weight.

19. A method of using a two-part formulation derived from water based solutions having the ability to micro encapsulate hydrocarbon and/or chemical contaminants on surfaces, in soils or sludges, the method comprising:
   a. preparing a first solution comprising water; a predetermined ratio of a water soluble alkaline silicate solution having at least one alkali metal; and a predetermined ratio of at least one water soluble surfactant;
   b. preparing a second solution comprising water and:
      a predetermined ratio of water soluble acid;
      a predetermined ratio of water dispersible polymer;
      a predetermined ratio of water soluble hydrotrope;
      a predetermined ratio of at least one water soluble flocculating agent;
   c. allowing said first solution to contact the hydrocarbon or chemical contaminant by batch mixing, spraying, fogging or misting;
   d. allowing said second solution to contact the first solution and contaminant to form a homogeneous mixture;
   e. removing said homogeneous mixture.

20. A method of using a two-part formulation derived from water based solutions having the ability to detoxify and micro encapsulate hazardous chemical and biological substances such as TIC's, TM's, and CB Agents on surfaces and soils, the method comprising:

a. preparing a first solution comprising water and:
a predetermined ratio of at least one water soluble surfactant; and if this solution is intended as the detoxifying solution,
a predetermined ratio of a water soluble detoxifying agent;

b. preparing a second solution comprising water and:
   a predetermined ratio of water soluble acid;
   a predetermined ratio of water dispersible polymer;
   a predetermined ratio of water soluble hydrotrope;
   a predetermined ratio of at least one water soluble flocculating agent; and if this solution is intended as the detoxifying solution,
   a predetermined ratio of at least one water soluble quaternary surfactant agent;
c. providing a predetermined ratio of water soluble activating agent; and a predetermined ratio of a water soluble detoxifying agent;
d. allowing either the first solution with an optional detoxifying agent or the second solution with the optional detoxifying agent that requires the optional quaternary surfactant agent and activating agent to contact the TIC's, TMs, and CB agents by batch mixing, spraying, fogging or misting;
e. allowing a period of time sufficient for detoxification to occur;
f. allowing said second solution to contact the mixture to form a solid wet paste;
g. removing said solid wet paste.

* * * * *